US009355470B2

(12) United States Patent
Merrell et al.

(10) Patent No.: US 9,355,470 B2
(45) Date of Patent: May 31, 2016

(54) METHOD AND SYSTEM FOR INTERACTIVE LAYOUT

(71) Applicant: The Board of Trustees of the Leland Stanford, Junior, University, Palo Alto, CA (US)

(72) Inventors: Paul Merrell, Redwood City, CA (US); Vladlen Koltun, San Francisco, CA (US); Eric Schkufza, San Francisco, CA (US); Maneesh Agrawala, Oakland, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 13/690,238

(22) Filed: Nov. 30, 2012

(65) Prior Publication Data

US 2013/0222393 A1    Aug. 29, 2013

Related U.S. Application Data

(60) Provisional application No. 61/565,006, filed on Nov. 30, 2011.

(51) Int. Cl.
  *G06T 11/00* (2006.01)
  *G06T 19/00* (2011.01)
(52) U.S. Cl.
  CPC ............... *G06T 11/00* (2013.01); *G06T 19/00* (2013.01); *G06T 2210/04* (2013.01)
(58) Field of Classification Search
  USPC .................................. 345/441, 643; 715/757
  See application file for complete search history.

(56) References Cited

U.S. PATENT DOCUMENTS

| | | | |
|---|---|---|---|
| 8,010,906 B1* | 8/2011 | Sinnard et al. | 715/771 |
| 2008/0189166 A1* | 8/2008 | Brooks | 705/10 |
| 2010/0321407 A1* | 12/2010 | Mital et al. | 345/643 |

OTHER PUBLICATIONS

Bukowski, R. W., and Sequin, C. H. 1995. Object associations: a simple and practical approach to virtual 3d manipulation. In Proc. Symposium on Interactive 3D graphics, ACM.
Cagan, J., Shimada, K., and Yin, S. 2002. A survey of computational approaches to three-dimensional layout problems. Computer Aided Design 34, 8, 597-611.
Carbonell, J., and Goldstein, J. 1998. The use of MMR, diversity-based reranking for reordering documents and producing summaries. In Proc. SIGIR Conference on Research and Development in Information Retrieval, ACM.
Chaudhuri, S., Kalogerakis, E., Guibas, L., and Koltun, V. 2011. Probabilistic reasoning for assembly-based 3d modeling. In Proc. SIGGRAPH, ACM.
Christensen, J., Marks, J., and Shieber, S. 1995. An empirical study of algorithms for point-feature label placement. ACM Transactions on Graphics 14, 3, 203-232.
Deasy, C. M., and Lasswell, T. E. 1985. Designing Places for People. Watson-Guptill.
Fatahalian, K., and Houston, M. 2008. A closer look at GPUs. Communications of the ACM 51, 10, 50-57.

(Continued)

*Primary Examiner* — Maurice L McDowell, Jr.
(74) *Attorney, Agent, or Firm* — Guadalupe M. Garcia

(57) ABSTRACT

In an embodiment of the present invention, an interactive system employs sets of interior design guidelines. In an embodiment, the user begins by specifying the shape of a room and the set of furniture that must be arranged within it. The user then interactively moves furniture pieces. In response, the system suggests a set of furniture layouts that follow the interior design guidelines. The user can interactively select a suggestion and move any piece of furniture to modify the layout.

33 Claims, 26 Drawing Sheets

(56) References Cited

OTHER PUBLICATIONS

Fisher, M., and Hanrahan, P. 2010. Context-based search for 3d models. In Proc. SIGGRAPH Asia, ACM.

Germer, T., and Schwarz, M. 2009. Procedural arrangement of furniture for real-time walkthroughs. Computer Graphics Forum 28, 8, 2068-2078.

Geyer, C. 1991.MarkovchainMonteCarlomaximumlikelihood. In Proc. of the 23rd Symposium on the Interface: Computing Science and Statistics, 156-163.

Harada, M., Witkin, A., and Baraff, D. 1995. Interactive physically-based manipulation of discrete/continuous models. In Proc. SIGGRAPH, ACM.

Hoff, III, K. E., Keyser, J., Lin, M., Manocha, D., and Culver, T. 1999. Fast computation of generalized Voronoi diagrams using graphics hardware. In Proc. SIGGRAPH, ACM.

Lok, S., Feiner, S., and Ngai, G. 2004. Evaluation of visual balance for automated layout. In Proc. International Conference on Intelligent User Interfaces, ACM.

Michalek, J. J., and Papalambros, P. Y. 2002. Interactive design optimization of architectural layouts. Engineering Optimization 34, 5, 485-501.

* cited by examiner

Table 1

| Constraint | Distance (in) | Direction |
|---|---|---|
| Bedside | 36 | To the side |
| Seat | 30 | In front |
| Cabinets and shelving | 24 | In front |
| Dining table | 36 | All around |
| Coffee table to seat | 16 - 18 | In front of seat |
| End table to seat | 0 - 12 | To the back or side of seat |
| Nightstand to bed | 0 - 12 | To the side of bed |

Figure 10

METHOD AND SYSTEM FOR INTERACTIVE LAYOUT

CROSS-REFERENCE TO RELATED APPLICATIONS

This application claims priority to U.S. Provisional Application No. 61/565,006 filed Nov. 30, 2011, which is hereby incorporated by reference in its entirety for all purposes.

GOVERNMENT FUNDING

This invention was made with Government support under contracts 0835601, 0643552 and 0641402 awarded by the National Science Foundation. The Government has certain rights in this invention.

FIELD OF THE INVENTION

The present invention generally relates to computerized methods and systems for the layout of objects.

BACKGROUND OF THE INVENTION

Furniture placement is challenging because it requires jointly optimizing a variety of functional and visual criteria. Skilled interior designers follow numerous high-level guidelines in producing furniture layouts. In a living room, for example, the furniture should support comfortable conversation, align with prominent features of the space, and collectively form a visually balanced composition. In practice, these guidelines are often imprecise and sometimes contradictory. Experienced designers learn to balance the tradeoffs between the guidelines through an iterative trial-and-error process.

Yet, most people responsible for furnishing a home have no training in interior design. They may not be aware of interior design guidelines, and they are unlikely to have the tacit knowledge and experience required to optimally balance the tradeoffs. Instead, such amateur designers rely on intuitive rules such as pushing large furniture items against the walls. These intuitive rules often lead to functionally ineffective and visually imbalanced arrangements. The resulting furniture layouts may not "look or feel right," and even worse, the amateur designer "cannot pinpoint what the problems are."

Assisted direct manipulation interfaces have been studied in computer graphics, dating back to, for example, Ivan Sutherland's Sketch-Pad. In the context of architectural design, conventional approaches have described interfaces for creating floorplans, for example. Such an interface can support local constraints and invoke discrete local search whenever the user drives the layout into a challenging configuration. Other approaches use sequential quadratic programming to optimize an arrangement of rectangles in response to interactive manipulation. These approaches assist the layout of general rectangular arrangements but do not incorporate furniture layout guidelines.

Focusing on furniture layout, a conventional approach uses "object association" constraints that are designed to facilitate direct manipulation of furniture arrangements. For example, the user can constrain a bookshelf to slide along walls without penetration or separation. Certain other approaches present a constraint-based furniture layout system that incorporates pairwise relationships which enforce stability, non-penetration, and alignment. Others describe an agent-based procedure for furniture layout.

Layout problems arise in a number of domains. For example, one strategy is to use optimization techniques to find a layout that satisfies domain-specific criteria. Researchers have applied this optimization approach to circuit board layout, graph layout, component layout in product design, document layout, UI layout, label layout, and architectural floor plan layout, for example. Most of these approaches were developed for off-line layout and do not support direct manipulation or generation of multiple high-quality alternatives.

While tools may be available for visualizing furniture arrangements, such tools do not alleviate the physical strain of moving furniture pieces to prototype different layouts. The placement of the furniture relies entirely on the user's expertise, which is often insufficient to produce effective furniture arrangements.

Therefore, there is a need for a method and system that assists furniture placement by providing preferred suggestions based on interior design and other guidelines.

SUMMARY OF THE INVENTION

In contrast to conventional techniques, the presently described approach is based on established layout guidelines employed by practicing interior designers among other things. These guidelines include global criteria such as visual balance, which cannot be expressed as a collection of object associations or pairwise relationships. Among other things, the present invention can be used to help arrange furniture in homes or offices, for example, based on established interior design principles.

Most homeowners have no training in interior design and could use assistance in this regard such as provided by embodiments of the present invention. In an embodiment, the present invention provides suggestions for how to arrange furniture and allows homeowners to quickly visualize and explore many different possible arrangements. An embodiment of the present invention is implemented in software that provides intelligent suggestions for how to arrange furniture based on interior design guidelines. Embodiments of the present invention can be useful for people moving into a new home, for customers considering buying a new piece of furniture, or for people who are remodeling their homes. Before purchasing furniture items, customers can experiment with different layouts, assisted by embodiments of the present invention.

In an embodiment of the present invention, a set of interior design guidelines is identified for furniture layout and an interactive system implements these guidelines. In an embodiment, the user begins by specifying the shape of a room and the set of furniture that must be arranged within it. The user then interactively moves furniture pieces. In response, the system suggests a set of furniture layouts that follow the interior design guidelines. The user can interactively select a suggestion and move any piece of furniture to modify the layout among other things. The user and computer work together to iteratively evolve the design.

A particular embodiment of the present invention represents the furniture layout guidelines as terms in a density function and treats manual placement of pieces as subspace constraints. Since the resulting function is highly multimodal, a Markov chain Monte Carlo sampler is employed to suggest optimized layouts. In another embodiment, in order to deal with the substantial computational requirements of stochastic sampling, graphics hardware is advantageously used to enable interactive performance.

Embodiments of the present invention can include the following features: a set of design guidelines for furniture layout is identified and operationalized; and an interactive system for creating furniture arrangements based on these guidelines is developed. Other embodiments can have more or less features.

Results from an embodiment of the present invention demonstrate that the suggestion generation functionality of an embodiment of the present invention measurably increases the quality of furniture arrangements produced by users with no prior training in interior design.

These and other embodiments can be more fully appreciated upon an understanding of the detailed description of the invention as disclosed below in conjunction with the attached figures.

BRIEF DESCRIPTION OF THE DRAWINGS

The following drawings will be used to more fully describe embodiments of the present invention.

FIG. 10 includes a table of certain anthropometric constraints as implemented in embodiments of the present invention.

DETAILED DESCRIPTION

Figure 11:
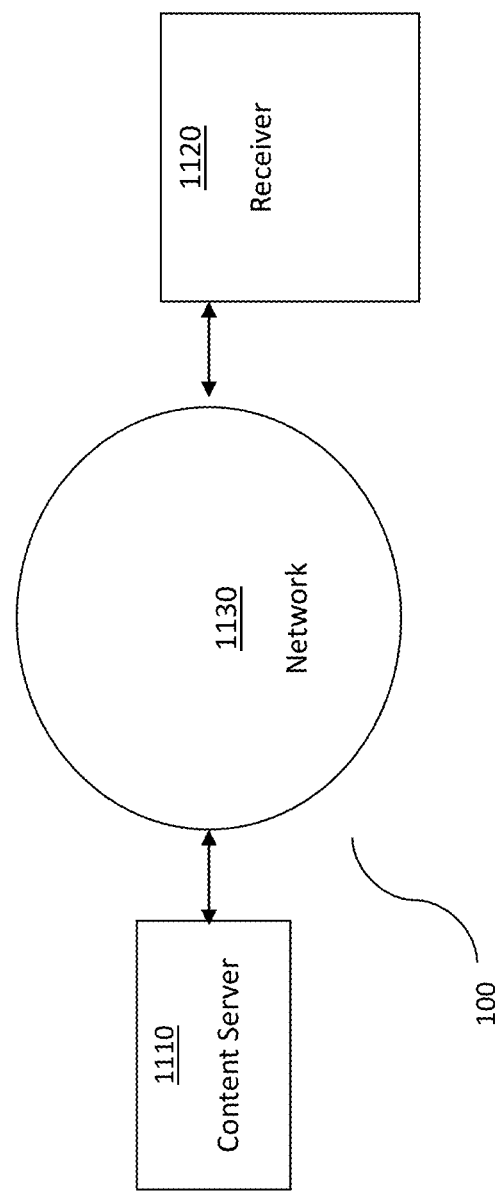
FIG. 11 is a schematic view of a networked system on which the present invention can be practiced.

Among other things, the present invention relates to methods, techniques, and algorithms that are intended to be implemented in a digital computer system. By way of overview that is not intended to be limiting, digital computer system 1100 as shown in FIG. 11 will be described. Such a digital computer or embedded device is well-known in the art and may include variations of the below-described system.

Those of ordinary skill in the art will realize that the following description of the present invention is illustrative only and not in any way limiting. Other embodiments of the invention will readily suggest themselves to such skilled persons, having the benefit of this disclosure. Reference will now be made in detail to specific implementations of the present invention as illustrated in the accompanying drawings. The same reference numbers will be used throughout the drawings and the following description to refer to the same or like parts.

Further, certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory that can direct a computer or other programmable apparatus to function in a particular manner, such that the instructions stored in the computer-readable memory produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks.

Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems which perform the specified functions or steps, or combinations of special purpose hardware and computer instructions.

For example, any number of computer programming languages, such as C, C++, C# (CSharp), Perl, Ada, Python, Pascal, SmallTalk, FORTRAN, assembly language, and the like, may be used to implement aspects of the present invention. Further, various programming approaches such as procedural, object-oriented or artificial intelligence techniques may be employed, depending on the requirements of each particular implementation. Compiler programs and/or virtual machine programs executed by computer systems generally translate higher level programming languages to generate sets of machine instructions that may be executed by one or more processors to perform a programmed function or set of functions.

The term machine-readable medium should be understood to include any structure that participates in providing data which may be read by an element of a computer system. Such a medium may take many forms, including but not limited to, non-volatile media, volatile media, and transmission media. Non-volatile media include, for example, optical or magnetic disks and other persistent memory. Volatile media include dynamic random access memory (DRAM) and/or static random access memory (SRAM). Transmission media include cables, wires, and fibers, including the wires that comprise a system bus coupled to processor. Common forms of machine-readable media include, for example, a floppy disk, a flexible disk, a hard disk, a magnetic tape, any other magnetic medium, a CD-ROM, a DVD, any other optical medium.

FIG. 11 depicts an exemplary networked environment 1100 in which systems and methods, consistent with exemplary embodiments, may be implemented. As illustrated, networked environment 1100 may include a content server 1110, a receiver 1120, and a network 1130. The exemplary simplified number of content servers 1110, receivers 1120, and networks 1130 illustrated in FIG. 11 can be modified as appropriate in a particular implementation. In practice, there may be additional content servers 1110, receivers 1120, and/or networks 1130.

In certain embodiments, a receiver 1120 may include any suitable form of multimedia playback device, including, without limitation, a computer, a gaming system, a smart phone, a tablet, a cable or satellite television set-top box, a DVD player, a digital video recorder (DVR), or a digital audio/video stream receiver, decoder, and player. A receiver 1120 may connect to network 1130 via wired and/or wireless connections, and thereby communicate or become coupled with content server 1110, either directly or indirectly. Alternatively, receiver 1120 may be associated with content server 1110 through any suitable tangible computer-readable media or data storage device (such as a disk drive, CD-ROM, DVD, or the like), data stream, file, or communication channel.

Network 1130 may include one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an Internet Protocol Multimedia Subsystem (IMS) network, a private network, the Internet, an intranet, and/or another type of suitable network, depending on the requirements of each particular implementation.

One or more components of networked environment 1100 may perform one or more of the tasks described as being performed by one or more other components of networked environment 1100.

Figure 12:
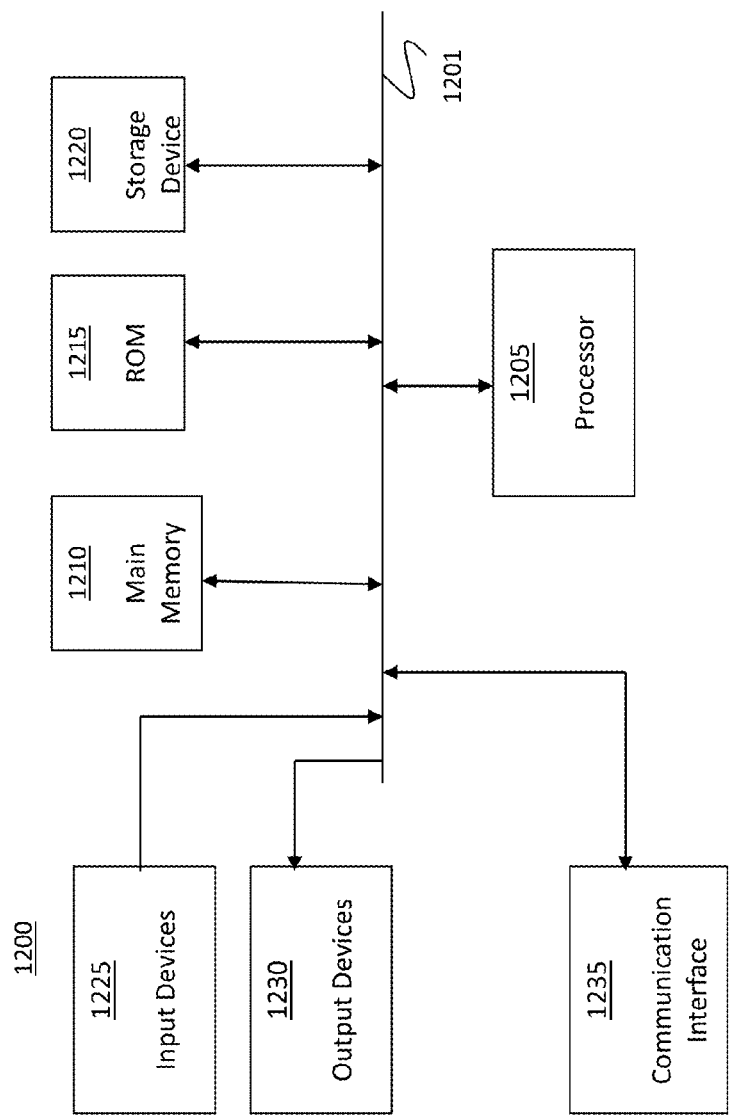
FIG. 12 is a schematic view of a computer system on which the present invention can be practiced.

FIG. 12 is an exemplary diagram of a computing device 1200 that may be used to implement aspects of certain embodiments of the present invention, such as aspects of content server 1110 or of receiver 1120. Computing device 1200 may include a bus 1201, one or more processors 1205, a main memory 1210, a read-only memory (ROM) 1215, a storage device 1220, one or more input devices 1225, one or more output devices 1230, and a communication interface 1235. Bus 1201 may include one or more conductors that permit communication among the components of computing device 1200.

Processor 1205 may include any type of conventional processor, microprocessor, or processing logic that interprets and executes instructions. Moreover, processor 1205 may include processors with multiple cores. Also, processor 1205 may be multiple processors. Main memory 1210 may include a random-access memory (RAM) or another type of dynamic storage device that stores information and instructions for execution by processor 1205. ROM 1215 may include a conventional ROM device or another type of static storage device that stores static information and instructions for use by processor 1205. Storage device 1220 may include a magnetic and/or optical recording medium and its corresponding drive.

Input device(s) 1225 may include one or more conventional mechanisms that permit a user to input information to computing device 1200, such as a keyboard, a mouse, a pen, a stylus, handwriting recognition, voice recognition, biometric mechanisms, and the like. Output device(s) 1230 may include one or more conventional mechanisms that output information to the user, including a display, a projector, an A/V receiver, a printer, a speaker, and the like. Communication interface 1235 may include any transceiver-like mechanism that enables computing device/server 1200 to communicate with other devices and/or systems. For example, communication interface 1235 may include mechanisms for communicating with another device or system via a network, such as network 1130 as shown in FIG. 11.

As will be described in detail below, computing device 1200 may perform operations based on software instructions that may be read into memory 1210 from another computer-readable medium, such as data storage device 1220, or from another device via communication interface 1235. The software instructions contained in memory 1210 cause processor 1205 to perform processes that will be described later. Alternatively, hardwired circuitry may be used in place of or in combination with software instructions to implement processes consistent with the present invention. Various implementations are not limited to any specific combination of hardware circuitry and software.

A web browser comprising a web browser user interface may be used to display information (such as textual and graphical information) on the computing device 1200. The web browser may comprise any type of visual display capable of displaying information received via the network 1130 shown in FIG. 11, such as Microsoft's Internet Explorer browser, Google's Chrome browser, Mozilla's Firefox browser, PalmSource's Web Browser or any other commercially available or customized browsing or other application software capable of communicating with network 1130. The computing device 1200 may also include a browser assistant. The browser assistant may include a plug-in, an applet, a dynamic link library (DLL), or a similar executable object or process. Further, the browser assistant may be a toolbar, software button, or menu that provides an extension to the web browser. Alternatively, the browser assistant may be a part of the web browser, in which case the browser would implement the functionality of the browser assistant.

The browser and/or the browser assistant may act as an intermediary between the user and the computing device 1200 and/or the network 1130. For example, source data or other information received from devices connected to the network 1130 may be output via the browser. Also, both the browser and the browser assistant are capable of performing operations on the received source information prior to outputting the source information. Further, the browser and/or the browser assistant may receive user input and transmit the inputted data to devices connected to network 1130.

Similarly, certain embodiments of the present invention described herein are discussed in the context of the global data communication network commonly referred to as the Internet. Those skilled in the art will realize that embodiments of the present invention may use any other suitable data communication network, including without limitation direct point-to-point data communication systems, dial-up networks, personal or corporate Intranets, proprietary networksd.

Overview

Most users have no training in interior design and could use assistance in this regard. Embodiments of the present invention can be used to help users arrange furniture in their homes or offices based on established interior design principles. In an embodiment, the present invention provides suggestions for how to arrange furniture and allows for quickly visualizing and exploring different arrangements. An embodiment of the present invention is implemented in software that provides intelligent suggestions for how to arrange furniture based on interior design guidelines.

Figure 1A:
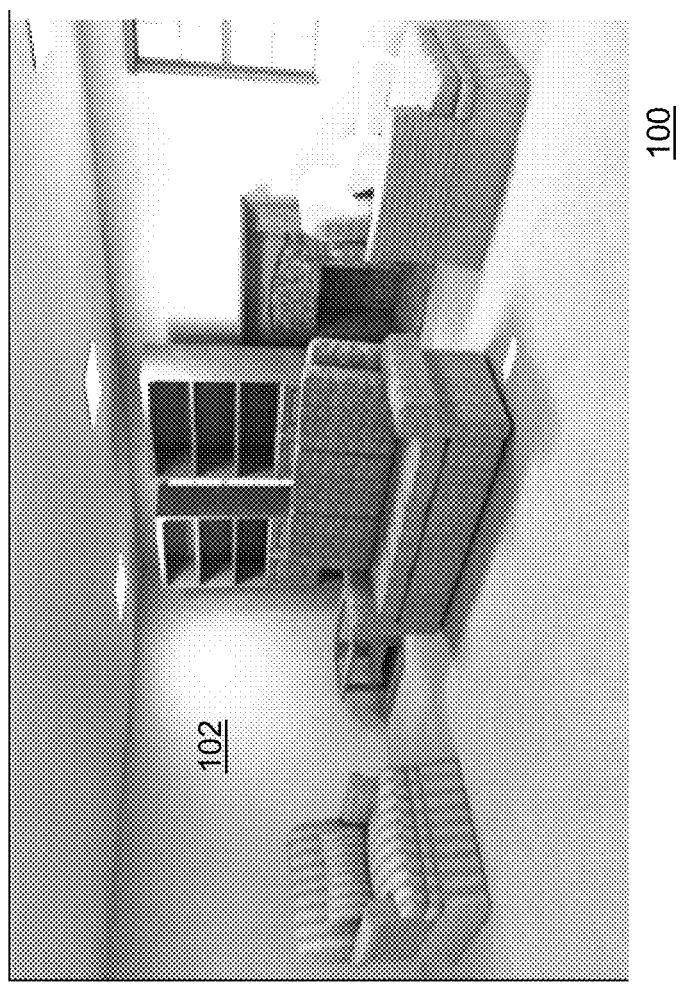
FIG. 1A is an illustration of a room that includes furniture configured in a random manner.

For example, shown in FIG. 1A is a room 100 that contains a configuration 102 of various items of randomly arranged furniture. In a traditional approach, owners of a home may attempt to find a desirable configuration by trial-and-error. For example, they may endeavor to move the items of furniture, some of which can be large and heavy, into various positions and then make an intuitive assessment as to its value. Such an approach can be cumbersome and may not lead to good results.

Figure 1B:
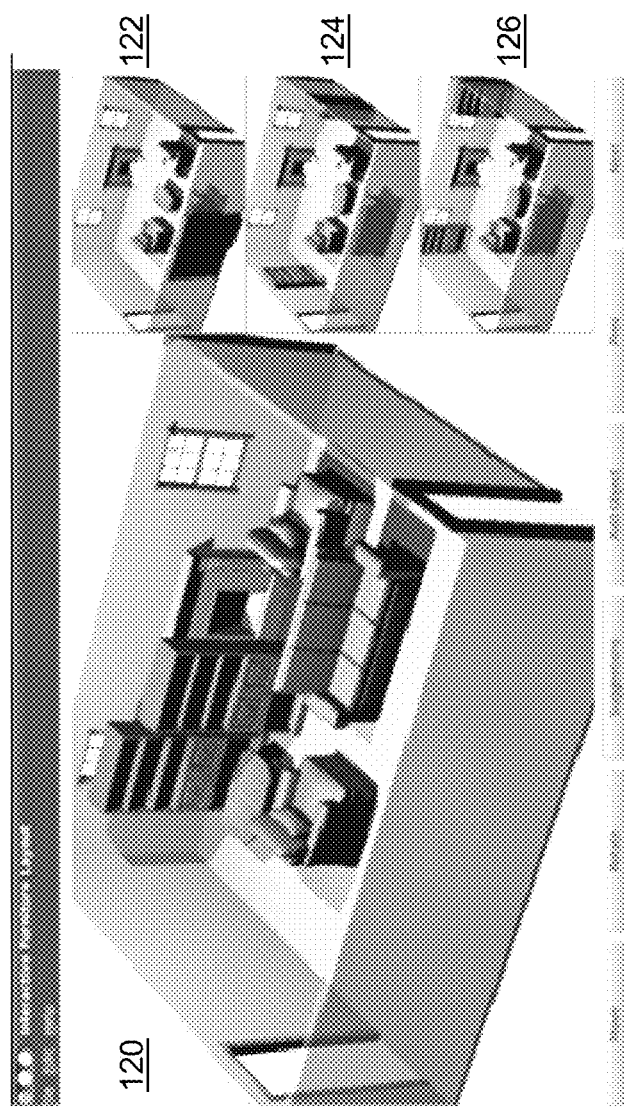
FIG. 1B is an illustration of a graphical user interface according to an embodiment of the present invention.

Through the use of a software implementation of the present invention such as shown in FIG. 1B, however, a user need not move furniture and can achieve a more preferred configuration based on established design principle. For example, a graphical interface 120 is provided that assists in arranging the furniture of room 100 by providing various alternative views 122, 124, and 126. In an embodiment of the present invention, a set of interior design guidelines is identified for furniture layout and an interactive system is developed based on these guidelines. In an embodiment, a user can specify the shape of a room and the set of furniture that is to be arranged within it. The user can interactively move furniture pieces. In response, the system according to an embodiment, suggests a set of furniture layouts that follow the interior design guidelines (e.g., alternative views 122, 124, and 126).

Figure 1C:
FIG. 1C is an illustration of a room that includes furniture configured using an embodiment of the present invention.

As shown in FIG. 1C, after implementation of an embodiment of the present invention, a preferred configuration 140 of room 100 is achieved. Among other things, configuration 140 can include certain objective and subjective features as will be described further below.

Figure 2A:
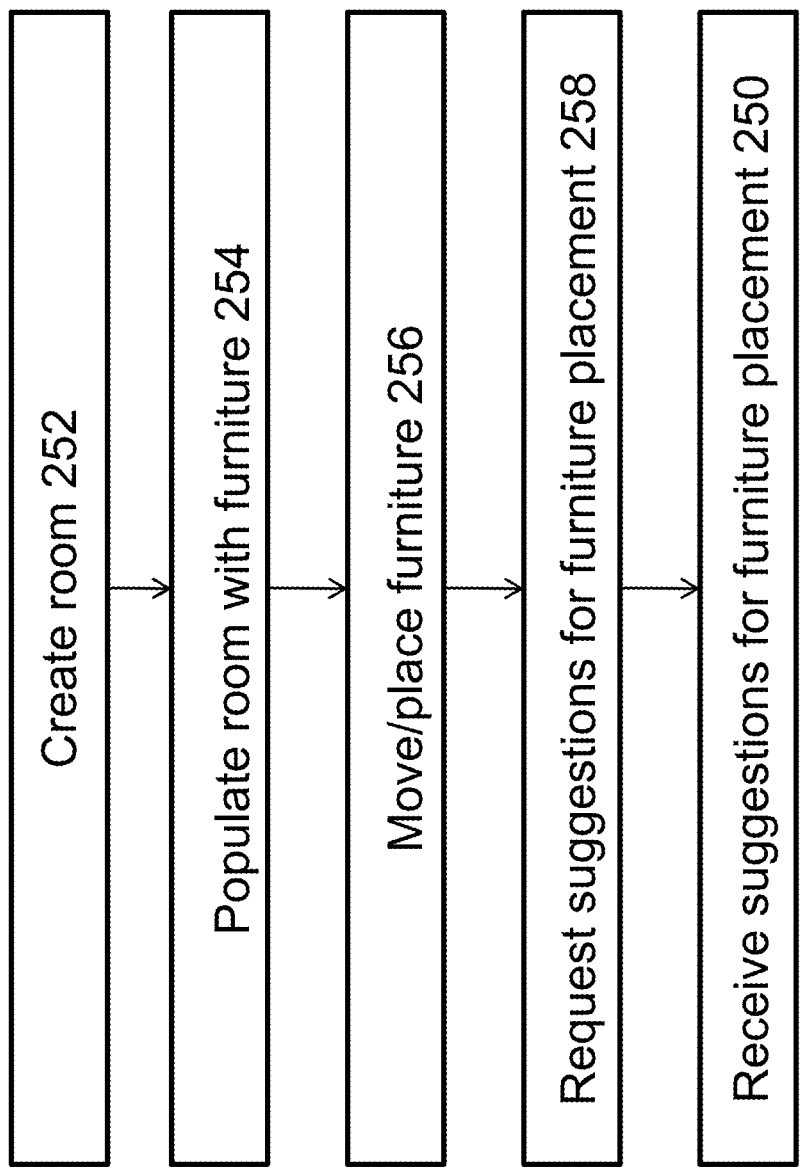
FIG. 2A is a flowchart of a method according to an embodiment of the present invention.

Shown in FIG. 2A is a method according to an embodiment of the present invention for computerized assistance in arranging furniture. It should be noted that the described embodiments are illustrative and do not limit the present invention. It should further be noted that the method steps need not be implemented in the order described. Indeed, certain of the described steps do not depend from each other and can be interchanged. For example, as persons skilled in the art will understand, any system configured to implement the method steps, in any order, falls within the scope of the present invention.

At step 252, a room to be populated with furniture is created. In an embodiment of the invention such a room is chosen from a library of rooms. In another embodiment of the invention, the room is created as a rectangle where its dimensions are specified. In yet another embodiment of the invention, a user can create a customized room of varying shapes. Also, features of a room can be specified such as the locations for doors, windows or other room features, such as areas where furniture cannot be placed.

At step 254, the room is then populated with furniture. In an embodiment of the present invention, furniture can be chosen from a library of furniture items. For example, an implementation can be designed to feature preferred manufacturers or distributors of furniture. In another embodiment, the library of items can be generic furniture items. In yet another embodiment, the library of furniture can be customized to a particular user. And in still another embodiment of the present invention, suggested furniture items are presented based on characteristics of the room as well as certain desired functionality (e.g., office) or characteristics (e.g., colorful).

At step 256, a user can be presented with an opportunity to move and place furniture as he may desire. This can be an opportunity for the user to set a starting point for the suggestions that are generated by the present invention. In an embodiment, the user can be further presented with an opportunity to lock in the placement of certain items of furniture that will not be allowed to be moved or placed by the methods of the present invention. Notably, step 256 can be optional where, in an embodiment, suggestions for furniture placement are made immediately upon being introduced into the room.

At step 258, according to an embodiment of the present invention, a user can prompt the system to generate suggestions for placement of the furniture that has been populated in the room. At step, 250, the suggestions are received. In an embodiment, the suggestions can be prioritized according to a measure by which they meet certain furniture design rules, guidelines, or goals. In yet another embodiment, an interface is provided by which a user can visualize in a two- or three-dimensional manner the way a room may look and operate. For example, an implementation of the present invention can provide a way by which a room can be rotated and tilted. These and other features of the present invention will be further described below.

Figure 2B:
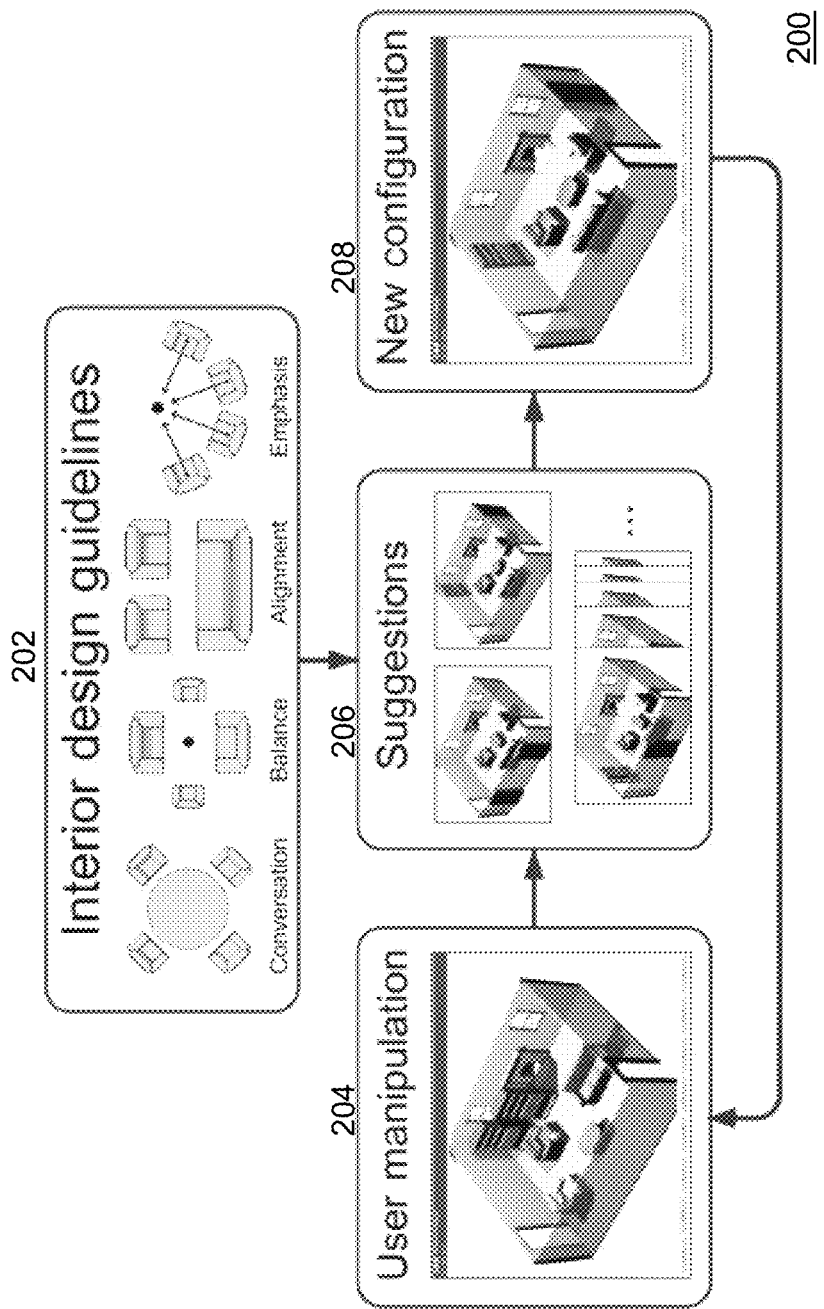
FIG. 2B is a flow diagram of a method according to an embodiment of the present invention.

To further illustrate embodiments of the present invention, shown in FIG. 2B is a graphic flow diagram of interaction with a system that highlights certain aspects of the present invention. It should be noted that the described embodiments are illustrative and do not limit the present invention. It should further be noted that the method steps need not be implemented in the order described. Indeed, certain of the described steps do not depend from each other and can be interchanged. For example, as persons skilled in the art will understand, any system configured to implement the method steps, in any order, falls within the scope of the present invention.

At step 204, a user can manipulate a layout. For example, upon initiating interaction with an embodiment of the present invention, a user can create a room and populate it with furniture at step 204. After user manipulation, an embodiment of the present invention implements interior design guidelines at step 202. For example, these guidelines can be objective or subjecting as will be described further below. As illustrated at step 202, interior design guidelines can include concepts such as conversation, balance, alignment, and emphasis.

With user manipulation at step 204 and the implementation of interior design guidelines at step 202, suggestions for alternative configurations are provided at step 206 from which a new configuration can be chosen at step 208. Subsequently, further user manipulation can be provided at step 204. Indeed, the various steps of the flow diagram of FIG. 2A or 2B can be implemented multiple times to achieve a preferred configuration.

In an embodiment, suggestions at step 206 are generated by sampling a density function, defined over the space of layouts of the current set of furniture in the specified room. The density function is defined using analytical formulations of interior design guidelines. Sampling is performed with a Markov chain Monte Carlo sampler, parallelized on graphics hardware. The sampler runs in a separate process, so that the user can continue the session while suggestions are being computed.

The suggestions at step 206 allow the user to experiment with different arrangement options that are optimized with respect to interior design guidelines. In an embodiment, the user can constrain the suggestions by fixing some of the items in place. The constraints simply reduce the dimensionality of the sampled space. This approach allows the user to progressively pin down the desired layout.

Furniture Layout Guidelines

Furniture layout design falls under the umbrella of space planning, a sub-field of interior design that deals with the allocation of spatial resources. Indeed, embodiments of the present invention are applicable to a wide variety of space planning applications including circuit board layout, graph layout, component layout in product design, document layout, UI layout, label layout, and architectural floor plan layout as would be appreciated by those of ordinary skill in the art upon an understanding of the teachings of the present invention. Nevertheless, furniture layout serves as a concrete example for demonstrating the broader aspects of the present invention.

Generally, an effective furniture layout must address both functional and visual criteria. The functional criteria evaluate how well the layout supports the human activities that take place in the space, such as conversation, rest, or movement. The visual criteria concern the perception of the layout as a visual composition. To identify guidelines for furniture layout, manuals on furniture layout were consulted and four professional designers who specialize in arranging furniture were interviewed.

Figures 3A, 3B:
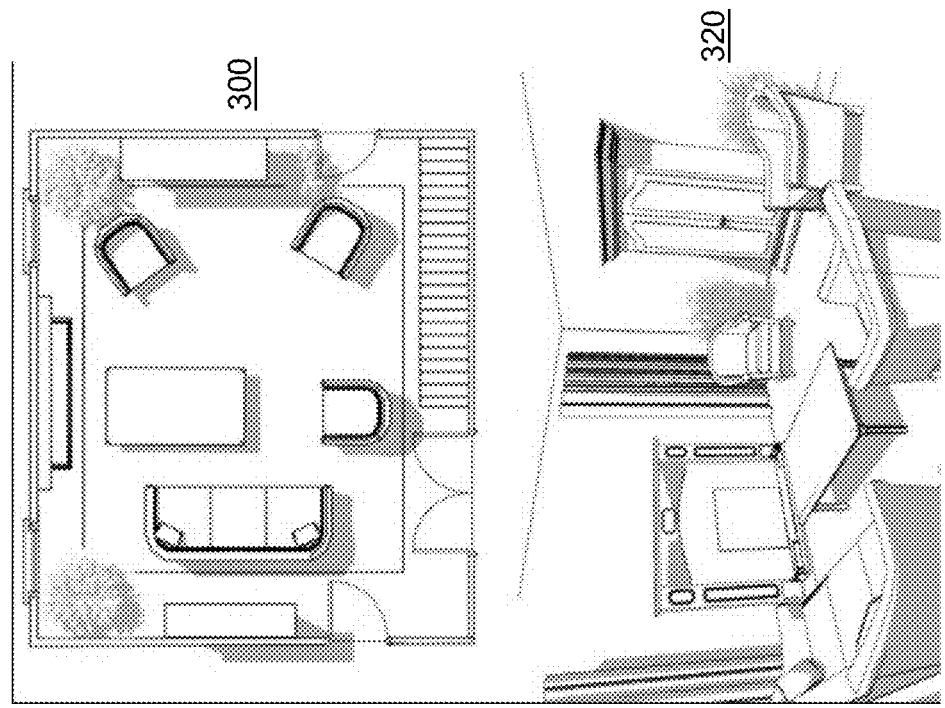
FIGS. 3A through 3D are illustrations of furniture layouts as configured by a professional decorator.
Figures 3C, 3D:
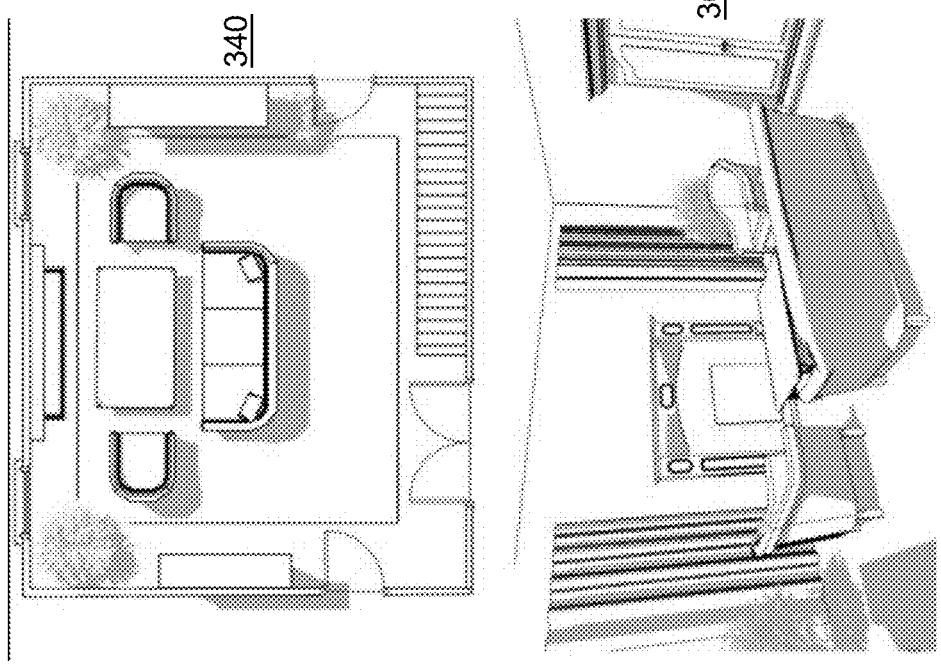

Shown in FIGS. 3A through 3D are real-world furniture layouts. More particularly, shown in FIGS. 3A and 3B are overhead view 300 and perspective view 320, respectively, of a furniture configuration before professional consultation. In such a configuration, people may need to raise their voices when people are seated throughout the room. Shown in FIGS. 3C and 3D are overhead view 340 and 360, respectively, of a furniture configuration after professional consultation. In such a configuration, conversations are more comfortable and the room has a visual anchor, the fireplace. These and other concepts will be described further below.

Described below are some exemplary design criteria and their analytic formulations as terms in a density function which lends itself to implementation in a computerized software product. Formally, a furniture layout is represented as a tuple I=(F, R, G), where F is the collection of furniture items placed in a room, R, that is a polygon delineating the boundaries of the room, and where $G \cup 2^F$ is a collection of groups of furniture pieces. Such groups can be formed by the user during an interactive layout session with the system of an embodiment of the present invention.

Functional Criteria

In an embodiment, functional criteria for furniture layout are based on the constraints imposed by human physiology and the effects of spatial layout on human behavior. The study of statistical distributions of human physical characteristics, such as body sizes and shapes, is known as anthropometrics. This study establishes guidelines for the necessary clearance around objects and for the proper distances and angles between objects. Table 1 as shown in FIG. 10 lists certain anthropometric constraints as used in an embodiment of the present invention to be described further below. Clearance constraints (shown in the upper portion of Table 1 as shown in FIG. 10) specify recommended amounts of free space around objects. Pairwise constraints (shown in the lower portion of Table 1 as shown in FIG. 10) specify recommended distances and angles between pairs of objects. Also discussed further below is a constraint authoring interface according to an embodiment of the present invention.

Other functional criteria stem from the study of environmental psychology, which examines how the layout of a space affects human activities. Two activities that are affected by furniture layout, for example, are conversation and circulation. Conversation is strongly affected by the placement of seats, whose arrangement must support comfortable eye contact and a normal speech volume. Circulation demands that there be sufficient space to comfortably walk to all parts of a room.

Clearance.

Many furniture items need open space around them to be accessible and functional. Beds need open space beside them, chairs and bookshelves need space in front of them, and dining room tables need space around their entire perimeter. Table 1 (top) as shown in FIG. 10 lists the clearance constraints used in an implementation of the present invention. Each constraint specifies the recommended clearance range and direction. To implement these constraints, the projection of each furniture item onto the ground plane is considered. Desired clearance is then added to the item by taking the Minkowski sum of its projection with a line segment or a disk sized according to Table 1 as shown in FIG. 10. This defines a set of regions JF that delineates furniture items and the clearance around them. In an embodiment, a clearance violation term $m_{cv}(I)$ is defined that minimizes the overlap between these regions:

$$m_{cv}(I) = \sum_{f,g \in \mathcal{J}_\mathcal{F} \cup \{R\}} A(f \cap g),$$

where $A(\cdot)$ is an area operator and R is the complement of the room polygon. In an implementation, the regions $J_F$ are approximated by polygons.

Circulation.

Figure 5A:
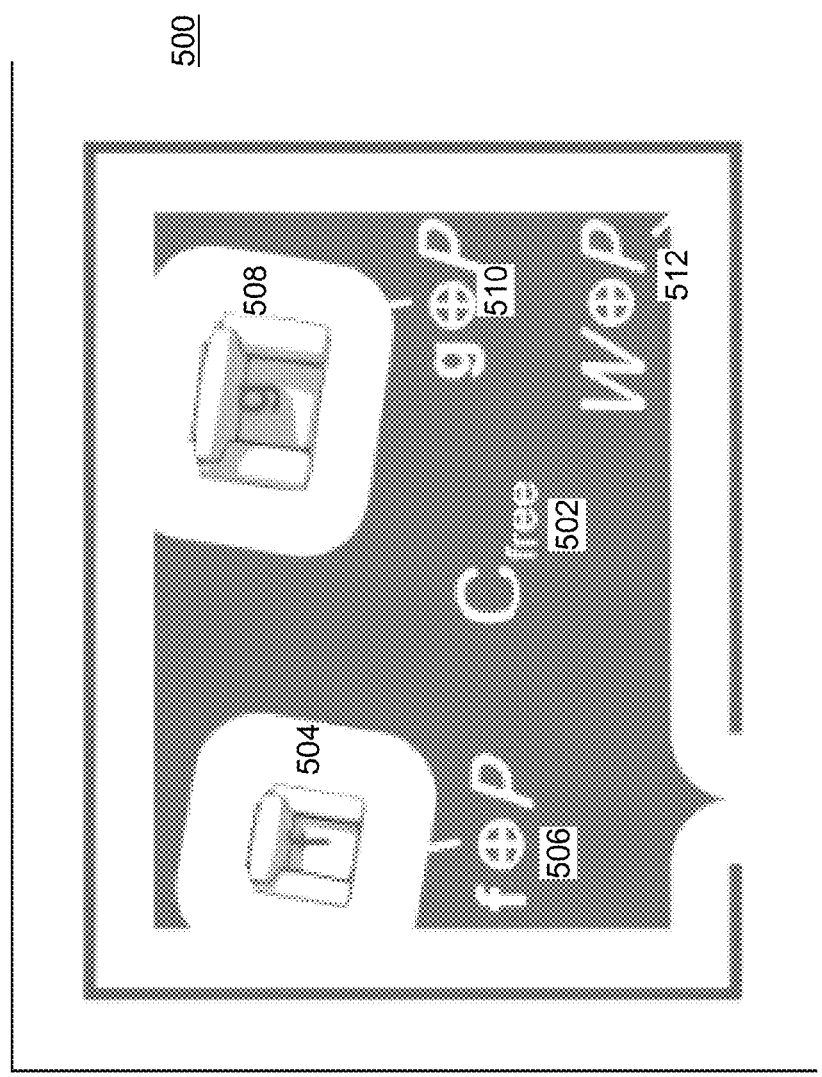
FIGS. 5A through 5E illustrate certain notation as implemented in embodiments of the present invention.

An effective furniture layout must support circulation through the room and access to all of the furniture. To evaluate circulation in an embodiment of the present invention, the methodology developed for robot motion planning is adopted and the free configuration space of a person on the ground plane of the room is computed. A person is approximated as a disk P of radius 18 inches. The Minkowski sum of P is computed and the ground plane projection of the collection F of furniture items as well as the collection W of wall segments in R are also computed. For example, with reference to FIG. 5A, see equations 506, 510, and 512 as they relate to room 500 and furniture items 504 and 508. Also, note that the free configuration space $C_{free}$ 502 is the intersection of the complement of these Minkowski sums:

$$C_{free} = \bigcap_{g \in \mathcal{F} \cup W} \overline{g \oplus \mathcal{P}}.$$

The circulation term $m_{ci}(I)$ is defined as the number of connected components in Cfree 502. For efficiency, this term is approximated using graphics hardware as will be discussed further below.

Pairwise Relationships.

Human physiology affects how objects should be positioned with respect to each other. For example, a coffee table should be placed within reach of a seat. Table 1 (bottom) as shown in FIG. 10 lists the pairwise constraints used in an implementation. Described further below is an authoring interface for specifying additional constraints. Shown in FIG.

Figure 5B:
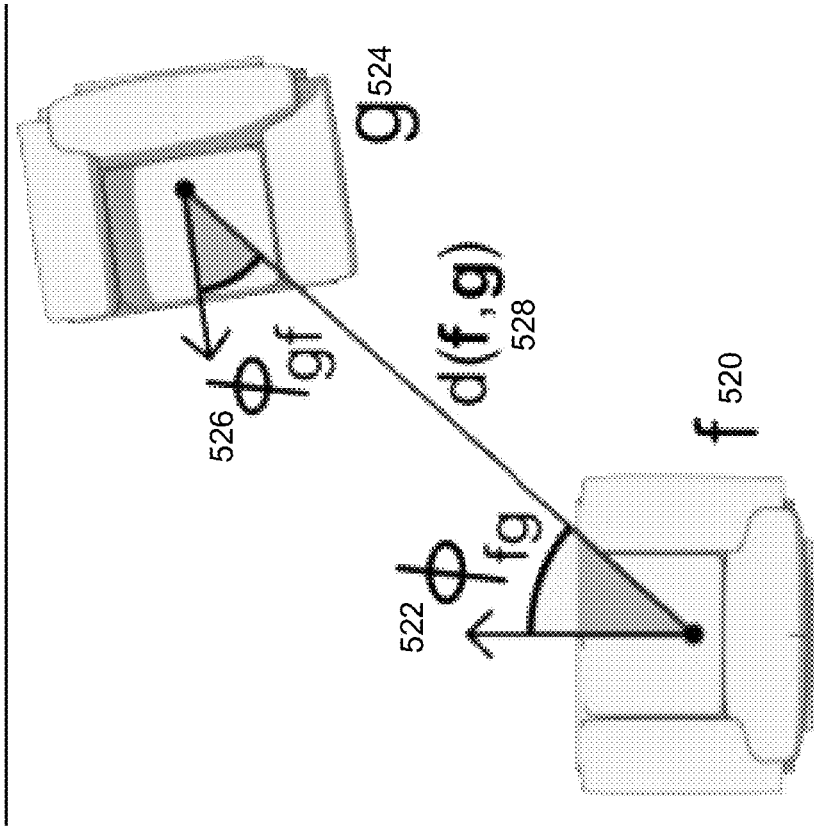

5B are furniture items g 524 and f 520. Also indicated in FIG. 5B is the distance 528 between the furniture items as well as their angles 522 and 526 relative to each other. The pairwise distance for a pair of objects f and g is defined as $$m_{pd}(I) = -\sum_{f,g \in \mathcal{F}} p_{fg} \cdot t(d(f,g), m_{fg}, M_{fg}, 2),$$

where $p_{fg}=1$ if there is a pairwise constraint between f and g and 0 otherwise, $(m_{fg}, M_{fg})$ is the range of recommended distances (Table 1 (bottom)), and t is a simple objective term defined as $$t(d, m, M, \alpha) = \begin{cases} \left(\frac{d}{m}\right)^{\alpha} & d < m \\ 1 & m \leq d \leq M \\ \left(\frac{M}{d}\right)^{\alpha} & d > M \end{cases}$$

Figure 4:
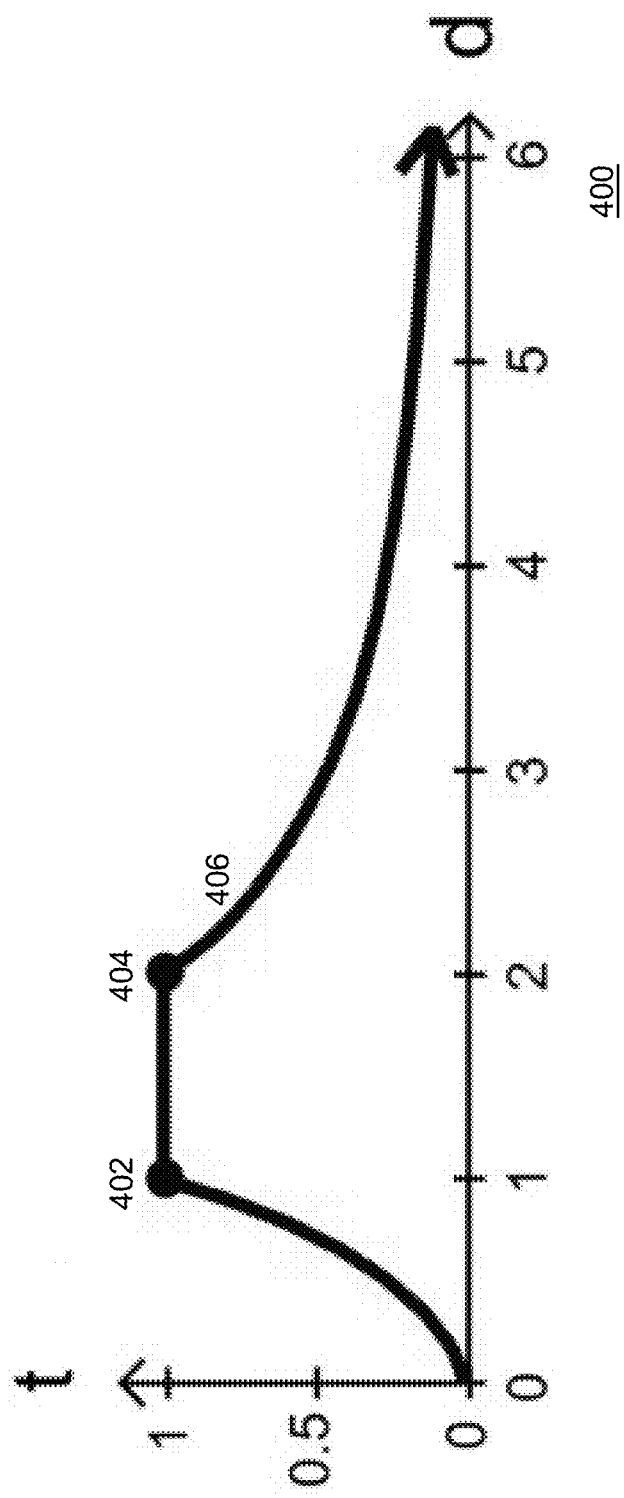
FIG. 4 is a graph of demonstrating the effectiveness of an embodiment of the present invention.

The t function, illustrated in FIG. 4, is designed to plateau when d is within the recommended range (m, M) (e.g., between points 402 and 404 of FIG. 4) and to gradually decrease (see line 406 of FIG. 4) as d goes below m or above M. The function has infinite support to attract the sampler (described further below) towards the recommended range regardless of the starting point. The degree of attraction is controlled by the parameter a.

An analogous pairwise angle term $m_{pa}(I)$ operationalizes the relative direction constraints specified in Table 1 (bottom) as shown in FIG. 10.

Conversation.

To support conversation at a normal tone of voice, the seats within a conversation area should be roughly four to eight feet apart. An interface according to an embodiment of the present invention allows the user to group a collection of furniture items into a conversation area. Given a collection G of these groups, the conversation distance term is formulated as $$m_{cd}(I) = \sum_{S \in \mathcal{G}} \sum_{f,g \in S} q_{fg} \cdot t(d(f,g), m_c, M_c, 2),$$

where $m_c=4$ and $M_c=8$ feet, and $q_{fg}=1$ if f and g are both seats and 0 otherwise.

The seats should also be angled towards each other to encourage eye contact. The conversation angle term is formulated as $$m_{ca}(I) = -\sum_{S \in \mathcal{G}} \sum_{f,g \in S} q_{fg}(\cos\phi_{fg} + 1)(\cos\phi_{gf} + 1),$$

where $\phi_{fg}$ is the angle between object f and object g (see FIG. 5B).

Visual Criteria

The visual criteria concern the perception of the furniture layout as a visual composition. The primary visual rules of thumb used by interior designers are visual balance, alignment, and a dominant point of emphasis.

Balance.

Figure 5C:
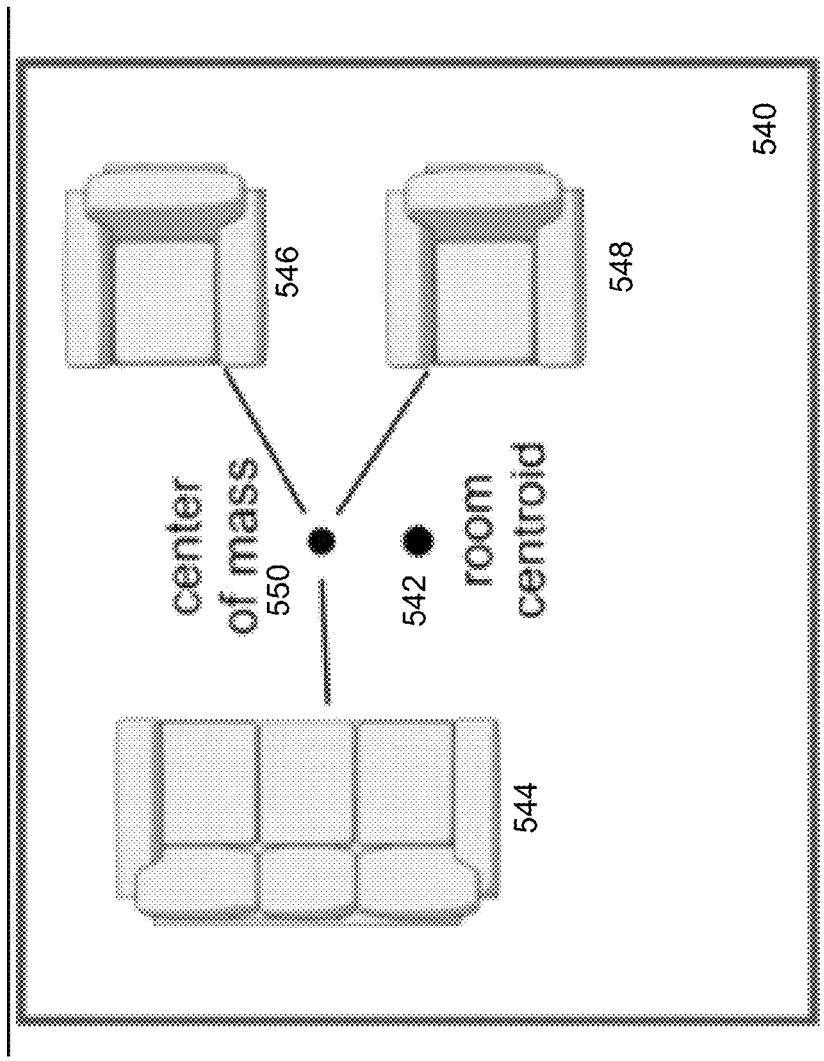

An important principle of visual composition is visual balance. The principle is to place the mean of the distribution of visual weight at the center of the composition. The visual weight of an element is its perceptual saliency. A common assumption is that larger objects such as item 544 of FIG. 5C carry more visual weight than items 546 and 548 with a center of mass 550. Since a furniture arrangement is three-dimensional, visual balance refers to the appearance of the arrangement from multiple viewpoints. A common simplification in practice is to evaluate the distribution of visual weight on the ground plane. The visual balance cost term is defined as $$m_{vb}(I) = \left\| \frac{\sum_{f \in \mathcal{F}} A(f) p(f)}{\sum_{f \in \mathcal{F}} A(f)} - c(\mathcal{R}) \right\|,$$

where A(f) and p(f) are the area and position of f, respectively, and $c(\mathcal{R})$ is the room's centroid 542 as shown in FIG. 5C.

Alignment.

Figure 5D:
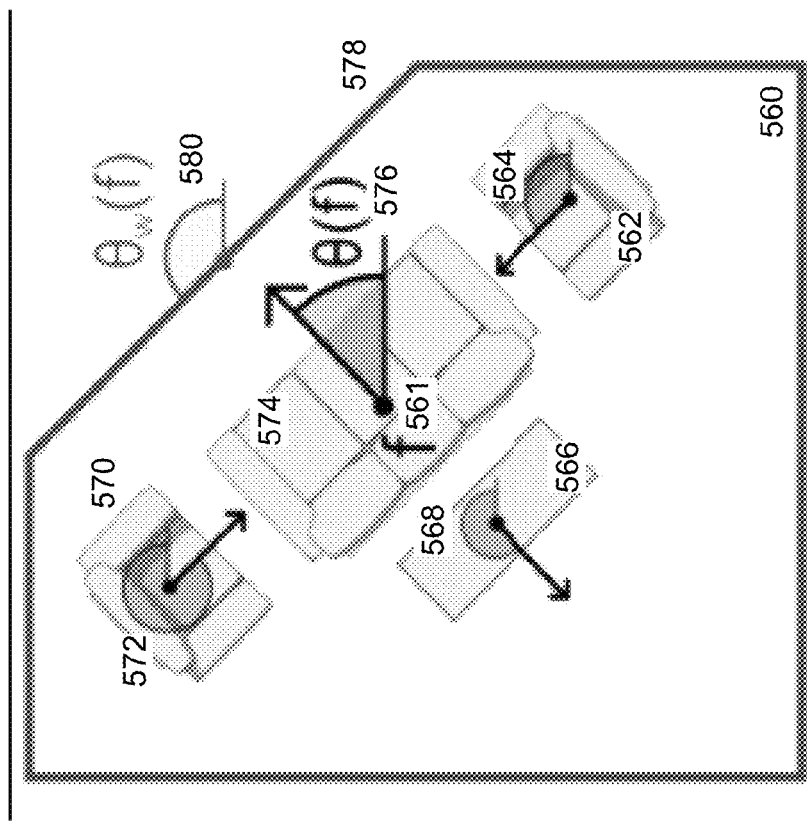

A basic principle of graphic design is alignment. In furniture arrangement, alignment primarily concerns the orientation of the furniture items relative to each other and to the walls of the room. For example, with reference to FIG. 5D, furniture items 570, 574, 566, and 562 have an alignment relative to each other, but also have an alignment relative to wall 560 (see angles 564, 572, and 576) and further have an alignment relative to wall 578 (see angle 580). In an embodiment of the present invention, the furniture alignment term is defined as $$m_{fa}(I) = -\sum_{S \in \mathcal{G}} \sum_{f,g \in S} \cos(4(\theta(f) - \theta(g))),$$

where $\theta(f)$ is the angle of item f relative to a global coordinate frame (e.g., coordinate frame f 561 as shown in FIG. 5D). This encourages furniture items within groups to be parallel or at right angles. Furniture items should also be aligned with nearby walls (e.g., wall 578). The wall alignment term is defined as $$m_{wa}(I) = -\sum_{S \in \mathcal{G}} \sum_{f \in S} \cos(4(\theta(f) - \theta_w(f))),$$

where $\theta_w(f)$ returns the angle of the nearest wall segment to f.

Emphasis.

Another principle of visual presentation that plays a role in interior design is emphasis. It is generally desirable to have a dominant focal point in the interior, so that the eye can rest without suffering competing demands for visual attention. In residential interiors, the focal point is often a prominent object such as a fireplace, a large window, or an entertainment center.

Figure 5E:
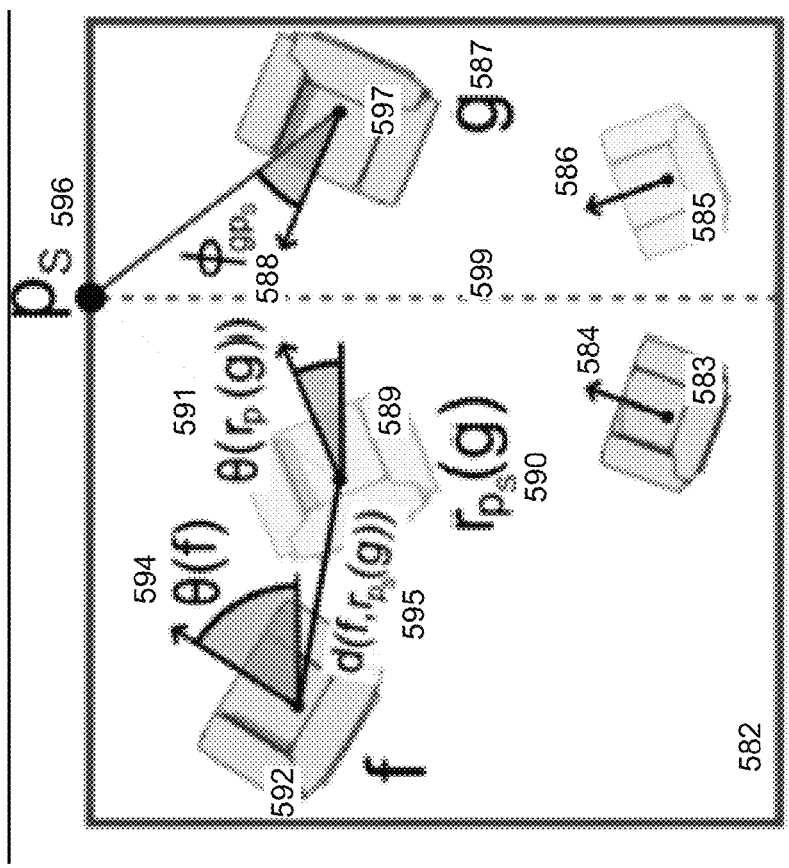

A system according to an embodiment of the present invention allows the user to form, as shown in FIG. 5D, a group S of furniture pieces 592, 589, 583, 585, and 587, and to associate S with a focal point $p_S$ 596. The focal point is emphasized by orienting the furniture items to face it and by arranging the items symmetrically around it. The first emphasis term is defined as $$m_{ef}(I) = -\sum_{S \in \bar{\mathcal{G}}} \sum_{g \in S} \cos\phi_{gps},$$

where $\bar{\mathcal{G}}$ is the set of groups that are associated with focal points and $\phi_{gpS}$ is the angle of g with respect to the focal point $p_S$. This encourages objects to face the focal point such as shown by rays 584 and 586 of FIG. 5E.

The second emphasis term evaluates the symmetry of groups about their focal points. Let s(f, g, p) be a function that measures the degree of symmetry of items f and g about a focal point p. In an implementation, this function is defined in terms of the angles (e.g., angles 594 and 591) and distances (e.g., distance 595) of f and g to the focal point:

$$s(f,g,p) = \cos(\theta_p(f) - \theta_p(r_p(g))) - \gamma d(f, r_p(g)).$$

Here $\gamma$ is a coefficient that determines the relative importance of distance and $r_p(g)$ is the reflection of g across the symmetry axis 599 defined by p. The symmetry term is defined as $$m_{sy}(I) = -\sum_{S \in \bar{\mathcal{G}}} \sum_{f \in S} \max_{g \in S_f} s(f, g, p_s),$$

where $S_f \cup S$ is the set of furniture items that match f. For example, seats match other seats, while they do not match tables.

Authoring

A system according to an embodiment of the present invention provides an interface for authoring new constraints, which is useful when adding new types of furniture. In an embodiment, the pieces of furniture in the library are categorized by type. New furniture models can be imported and new furniture types can be introduced. Existing constraints can be edited and new constraints can be added. For example, if the set of furniture types is augmented with a billiard table, an appropriate clearance constraint—specifying sufficient clearance for manipulating pool cues—can be added. Similarly, a pairwise constraint for placing filing cabinets near desks can be added. The user can also edit the parameters of each of the constraints, although these parameters were never modified during the evaluation.

Generating Suggestions

The objective terms discussed above are aggregated into a cost function $c_{R,G}(F)$ that evaluates how much a given furniture arrangement I=(F, R, G) conforms to the interior design guidelines. The cost function is defined as $$c_{R,G}(\mathcal{F}) = \sum_i w_i m_i(I),$$

where $i \in \{cv, ci, pd, pa, cd, ca, vb, fa, wa, sy, ef\}$ and $w_i$ are the mixture weights. In an implementation, the weights were set empirically. A goal in this embodiment is to produce multiple furniture arrangements F that minimize $c_{R,G}(F)$ in order to present them as suggestions to the user. Note that the subscripts R, G are omitted in the balance of the present disclosure for brevity without loss of clarity. In an embodiment, the user can also freeze the placement of specific furniture items. In an implementation, this fixes some of the values of F and restricts the optimization to the remaining values.

The function c is highly multimodal and is not amenable to exact optimization techniques. A Markov chain Monte Carlo sampler is employed to explore the function and produce multiple optimized samples. Specifically, a Boltzmann-like density function is defined as $$p(\mathcal{F}) = \frac{1}{Z}\exp(-\beta c(\mathcal{F})),$$

where $\beta$ is a temperature constant (discussed in more detail below) and Z is the partition function that normalizes the distribution. Computing Z can be computationally intractable. The Metropolis-Hastings algorithm is designed to explore density functions such asp without the need to compute the partition function. The algorithm maintains a current configuration F and iteratively proposes a modified configuration F that is either accepted or rejected. If the proposal is accepted, F becomes the current configuration. The algorithm iterates until its computational budget is exhausted. All accepted samples are retained for possible use as suggestions.

The acceptance of a proposal move F→F* is governed by the Metropolis-Hastings acceptance probability $$\alpha(\mathcal{F} \to \mathcal{F}^*) = \min\left(1, \frac{p(\mathcal{F}^*)q(\mathcal{F} \mid \mathcal{F}^*)}{p(\mathcal{F})q(\mathcal{F}^* \mid \mathcal{F})}\right), \quad (1)$$

where q(F*|F) is the proposal distribution from which a new configuration F* is sampled given a current configuration F. This proposal distribution is key to a successful application of the algorithm. To allow rapid exploration of the density function, the proposal distribution must make both local proposals that make minor modifications to the configuration and global modifications that induce significant rearrangements. The proposal distribution chooses among three possible proposal moves with equal probability. The first two moves make local adjustments by changing the position or orientation of a single furniture item. The last move swaps two items, which allows for rapid reconfigurations. In an embodiment, the proposal moves are as follows:

Perturb the position of a random furniture item by adding a Gaussian term N(0, $\sigma^2$) to each coordinate.

Perturb the orientation of a random furniture item by N(0, $\sigma_\theta^2$).

Swap the positions and orientations of two randomly selected furniture items.

The standard deviations $\sigma$ and $\sigma_\theta$ are set empirically. The key advantage of this set of moves is their effectiveness in exploring the space of layouts. Another advantage is that the proposal distribution is symmetric, that is, q(F*|F)=q(F|F*). This allows us to reduce the acceptance probability (equation 1) to the Metropolis ratio, which can be computed directly from the cost function c:

$$\alpha(\mathcal{F} \to \mathcal{F}^*) = \min\left(1, \frac{p(\mathcal{F}^*)}{p(\mathcal{F})}\right). \quad (2)$$

The algorithm produces a set of sampled layouts. The layouts can be sorted by cost and the lowest-cost ones can be returned as suggestions. This can, however, produce very similar suggestions if many of the lowest-cost samples come from a single mode of p. The list of samples using the Maximal Marginal Relevance criterion is diversified, which is commonly used for this purpose in information retrieval.

Implementation

A key challenge in the application of the Metropolis-Hastings algorithm is its high computational demands. For this reason, applications of global optimization techniques to layout problems have been traditionally restricted to off-line layout. A recent application of stochastic optimization to architectural layout reported running times of multiple minutes. Such lengthy running times are unacceptable for the embodiment described here since a goal is to provide responsive suggestions during an interactive layout session.

Figure 7A:
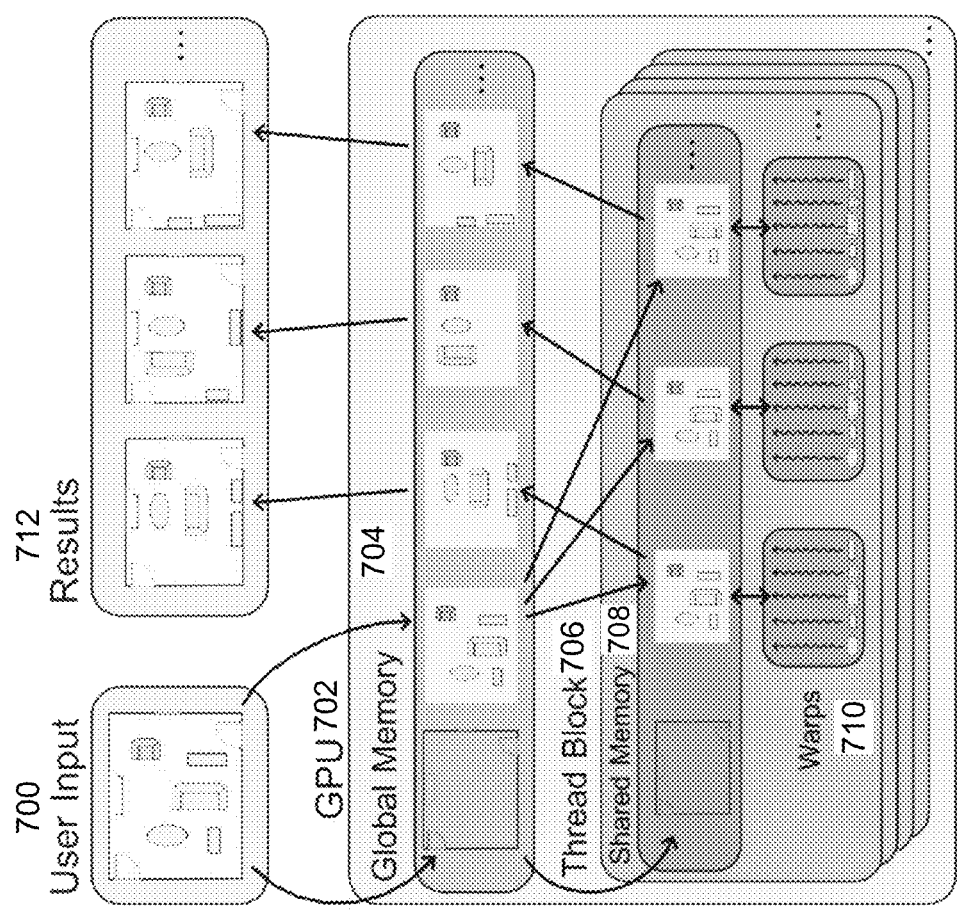
FIG. 7A is a flow diagram illustrating the manner in which embodiment of the present invention can be implemented in graphics hardware.

In an embodiment of the present invention, the sampler is hardware-accelerated by making use of the massively parallel architecture of graphics hardware as shown in FIG. 7A. In an embodiment, interactive suggestion generation performance is enabled by exploiting the architecture of graphics hardware. The system of this embodiment generates a variety of optimized suggestions in less than a second, allowing it to update the suggestions immediately in response to direct manipulation operations.

A key to the embodiment with parallel implementation is the use of a technique called parallel tempering. This technique runs a set of independent Markov chains with different temperature constants $\beta$. At a fixed interval two chains are chosen with some probability and propose to swap their current configurations. The proposal is accepted according to the acceptance probability (see equation 2). This allows "hot" chains to rapidly explore the configuration space and transfer their state to "cool" chains that can locally optimize within individual modes. Parallel tempering is often used in general applications of MCMC to improve the performance of the sampler without extensive parameter tuning. The technique for its additional property of parallelizing the sampling process is used.

The implementation of the present invention is illustrated in FIG. 7A. In an embodiment, interactive suggestion generation performance is enabled by exploiting the architecture of graphics hardware. For example, user input for a furniture layout is received as shown in block 700. Responsively, a graphics processing unit (GPU) 702 proceeds to perform certain of the calculations described above by making use of global memory 704 and thread block 706 along with its shared memory 706 toward generating certain suggestions (results) as shown in block 712. In an embodiment, Metropolis-Hastings is performed at the thread block 706 level. The inputs to the algorithm—the room and the given furniture arrangement—are copied to global memory 704 and, in turn, to the shared memory 708 of each thread 706. Within each block, multiple chains with different temperature constants are simulated in parallel by different warps 710. Exploring chains at the warp level minimizes the need for synchronization since there is no need for warps 710 to communicate other than to exchange temperature constants. Since warps 710 are able to fit their entire working sets in shared memory 708, access of global memory 704 are minimized.

Within each warp 710, the computation of the density function is performed at the thread level. Each thread is assigned a unique furniture object and is responsible for computing its contribution to the density function. The shared memory 708 between threads is partitioned to keep memory accesses coherent and to avoid memory divergence.

Results

The presented approach has been implemented in an interactive furniture layout system. Furniture is populated from a library of 866 furniture models extracted from the Digimation ModelBank Archive. The models were manually normalized to a consistent scale and orientation; the library was then organized into categories. The library contains chairs, couches, bookshelves, desks, coffee tables, dining tables, lamps, pianos, televisions, and other types of furniture.

In response to a suggestion generation query, the interface chooses the top 36 suggestions returned by the sampler and presents them in groups of three (e.g., see suggestions 122, 124, and 126 of FIG. 1B). The sampler is run for 10,000 iterations in parallel on each warp (see discussion for FIG. 7A). In experiments, further iterations yielded only small improvements (<0.1%) in the density function value, and 10,000 iterations were set (per warp) as the computational budget. The hardware-accelerated sampler was implemented using CUDA and tested on an NVIDIA GTX 480 with 1.5 GB of global memory. The number of thread blocks was set to 60 and the number of warps to four. For comparison, a sequential version of the sampler has been implemented and tested on a quad-core 2.66 GHz workstation with 4 GB of memory.

Figure 7B:
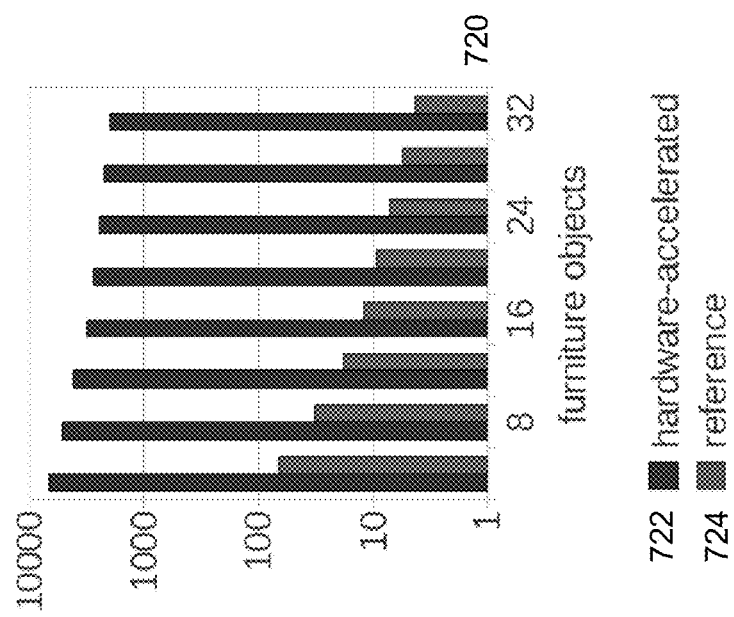
FIG. 7B is a graph illustrating certain performance improvements achieved using graphics hardware according to an embodiment of the present invention.

The performance comparison shown in graph 720 in FIG. 7B. The log-scale plot shows the number of density function evaluations performed per second (×1,000), as a function of the number of furniture items. As shown, the hardware-accelerated implementation is over two orders of magnitude faster than the reference sequential implementation. More specifically, hardware accelerated 722 performance is shown as better than reference 724 performance.

Figure 6:
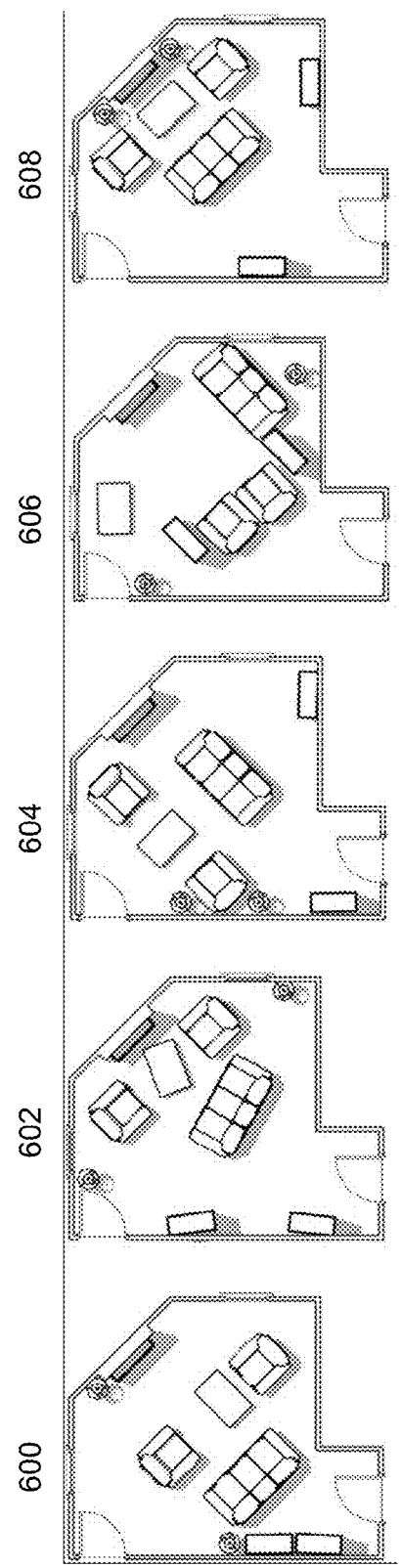
FIG. 6 includes illustrations of four furniture configurations that illustrate the importance of individual terms in a density function as implemented in an embodiment of the present invention.

Shown in FIG. 6 is a demonstration of the importance of individual terms in the density function as illustrated by the lowest-cost suggestion generated by the sampler for a given configuration when individual terms are ablated. In particular, note the different resulting configurations 600, 602, 604, 606, and 608. As shown, the lowest-cost samples produced by the sampler when individual cost terms are excluded (e.g., configurations 600, 602, 604, and 606) and when all terms are included (e.g., configuration 608). The following weights were used in an implementation: $w_{cv}=2$, $w_{ct}=1$, $w_{pd}=2$, $w_{pa}=2$, $w_{cd}=2$, $w_{ca}=$, $w_{vd}=1.5$, $w_{fa}=2.5$, $w_{wa}=2.5$, $w_{sy}=1$, and $w_{ef}=4$. Experiments were conducted with lowering and raising each weight by a factor of two; this mainly affected the order in which the suggested layouts were presented but not the suggestions themselves. The reported weights were fixed after initial experimentation and were not varied throughout the evaluation.

Figure 8A:
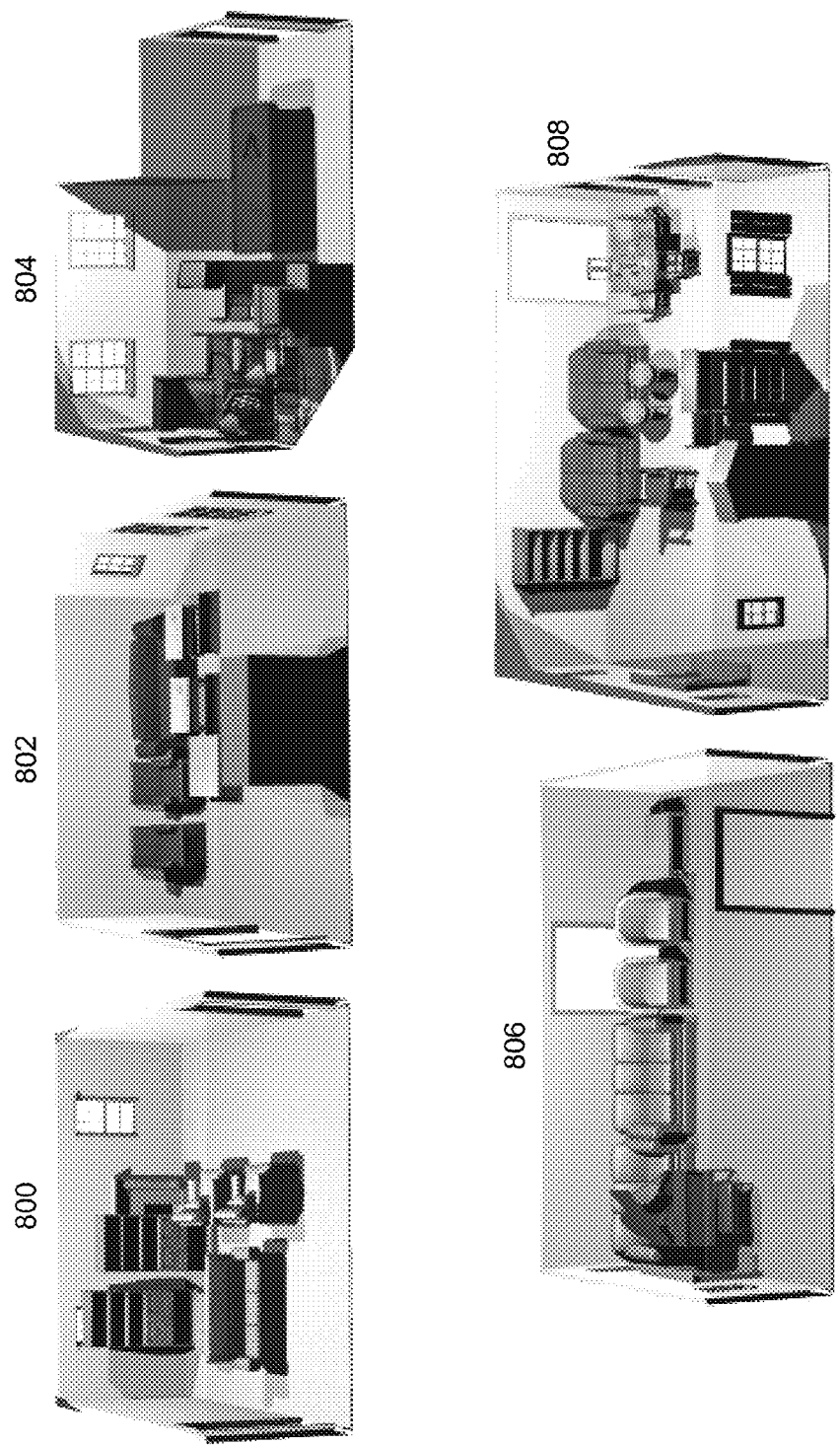
FIG. 8A includes illustrations of five rooms and the configuration of certain furniture items before implementation of an embodiment of the present invention.

Informal study. To evaluate the effectiveness of the system according to an embodiment of the present invention, an informal study was conducted with 18 participants having no interior design training. The participants were recruited from the student body of a computer science department in a research university. Each participant was given a five-minute tutorial of the layout interface and was then asked to arrange furniture in five rooms as shown in FIG. 8A: two living rooms 800 and 802, a game room 804, a piano room 806, and an open-wall living and dining room 808. Some participants did not complete all five arrangements due to time constraints.

The initial configurations are shown in FIG. 8A. Starting from these configurations, the participants were asked to arrange the rooms as they would in their own home. During the study, a system according to an embodiment of the present invention generated suggestions in an average of 0.748 seconds for the room 800, 0.734 seconds for room 802, 0.906 seconds for room 804, 0.734 seconds for room 806, and 1.026 seconds for room 808.

Each arrangement session was performed in one of two randomly chosen conditions: assisted and unassisted. In the assisted condition, the suggestion mode was enabled and the participant could see suggestions as demonstrated in FIG. 1B. In the unassisted condition, the suggestion mode was disabled. The interface was otherwise identical. In total, 81 arrangements were produced, 39 assisted and 42 unassisted.

In both conditions, participants were free to spend as much time as they desired to complete the task. Layout sessions in the assisted condition lasted 5 minutes and 10 seconds on average. Unassisted sessions were performed in 4 minutes and 50 seconds on average. In the assisted condition, participants were free to use the suggestion generation functionality multiple times. On average, 1.54 suggested layouts were used. Participants could ignore all suggestions but only did so 12% of the time. After they accepted a suggestion, participants made no further changes to the layout 23% of the time. After accepting the last suggestion, participants made an average of five position movements and four angle rotations.

Figure 8B:
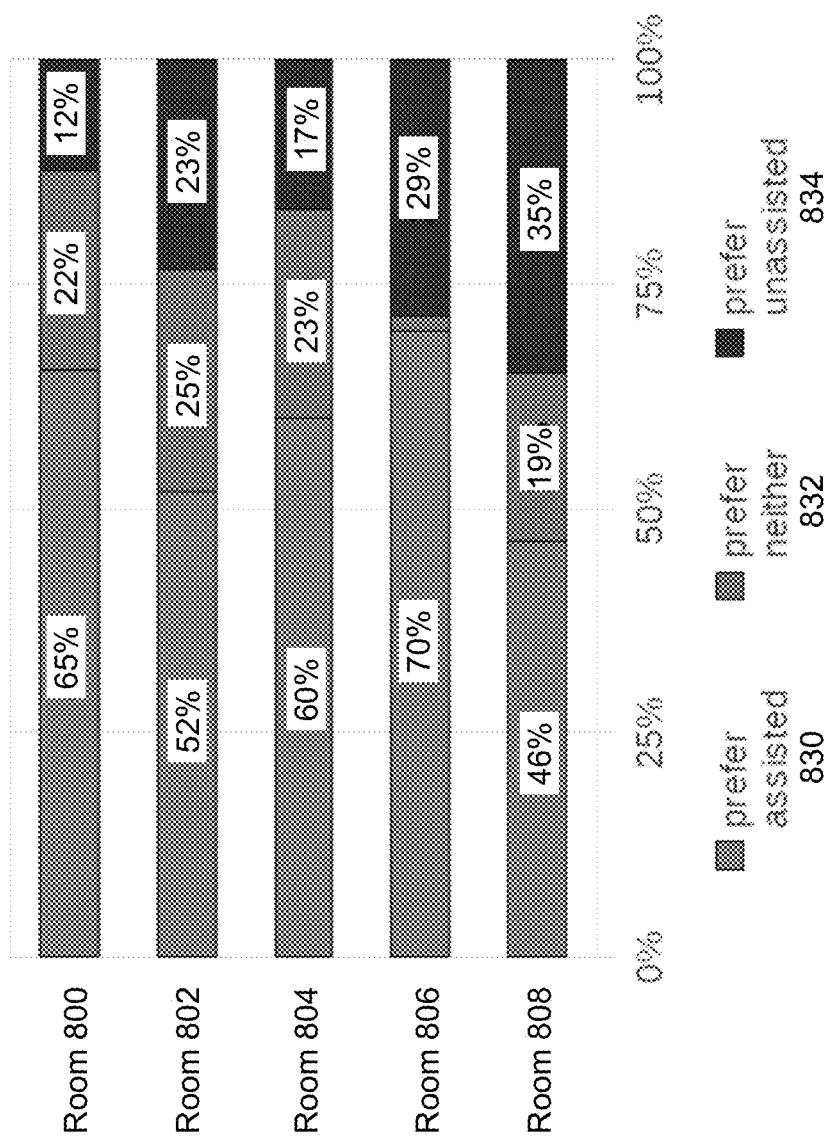
FIG. 8B is a chart illustrating the preference of certain furniture configurations.

The layouts produced by the participants in both conditions were evaluated by two professional interior designers who specialize in furniture arrangement. The evaluation was performed through computerized pairwise comparisons, administered without supervision. The designers were shown pairs of images of layouts produced during the experiment. Each pair contained two layouts of the same room, one created in the assisted condition and one unassisted. The images were presented side by side and their order on the screen was randomized. The conditions were not disclosed to the evaluators who were told that all layouts were produced with an interface that was developed. The evaluators could click one of three buttons to indicate whether they prefer the layout shown on the left, the one shown on the right, or neither. For each of the five rooms used in the evaluation, all pairs of assisted and unassisted layouts were ranked exactly once. In total, 334 pairwise rankings were performed. The comparison task was partitioned equally between the two designers. The results of the pairwise comparisons are shown in FIG. 8B. Layouts produced with and without suggestions were evaluated through blind pairwise comparisons by professional interior designers where the results indicate a statistically significant preference ($p<0.01$) for layouts produced with suggestions according to a two-tailed independent single sample t-test.

Figure 9A:
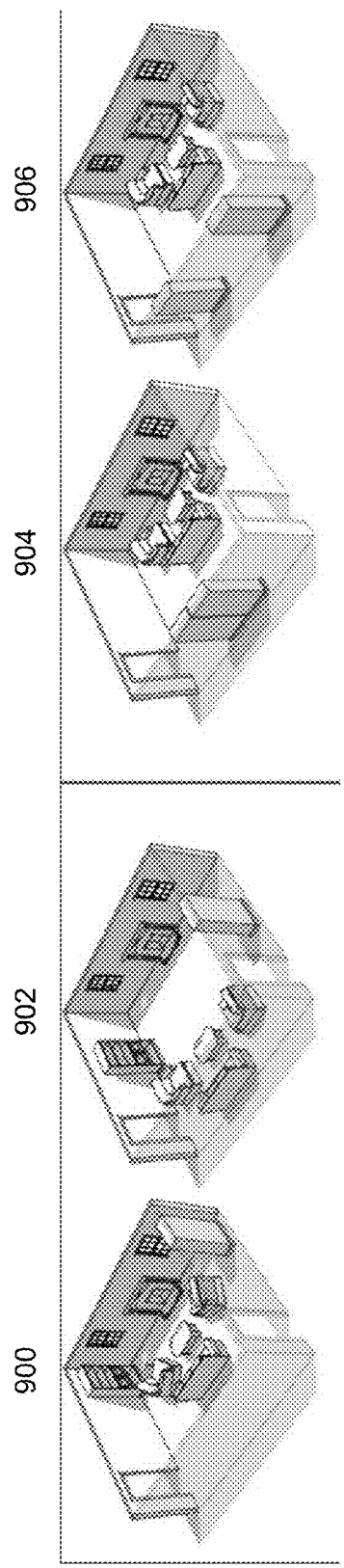
FIGS. 9A through 9E are illustrations of certain furniture configurations as developed using embodiments of the present invention.
Figure 9B:
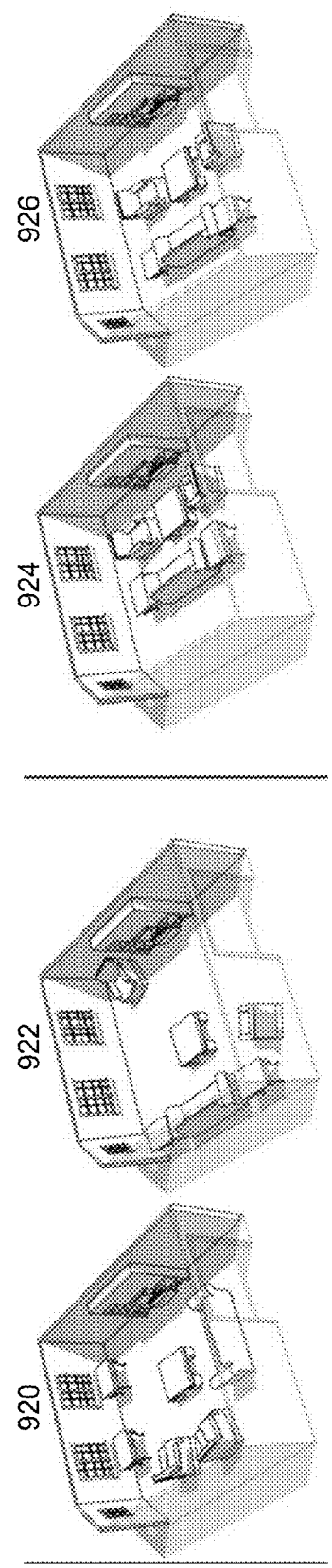
Figure 9C:
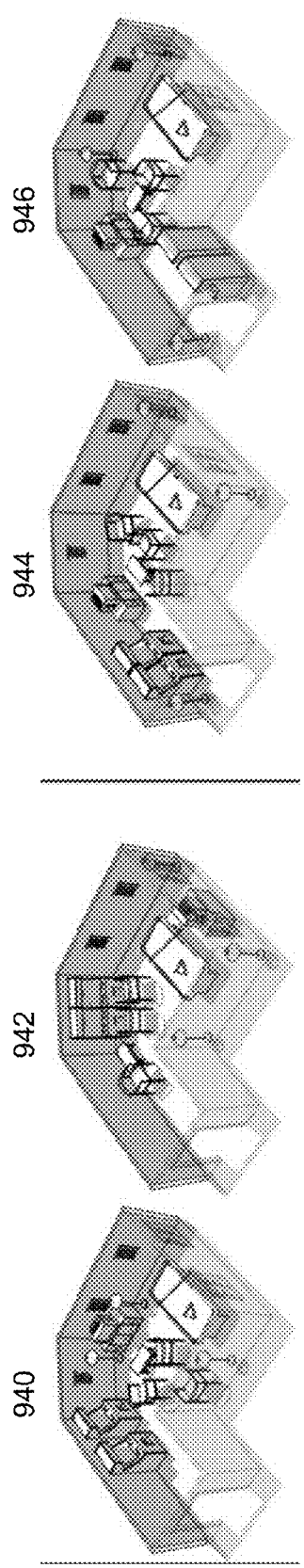
Figure 9D:
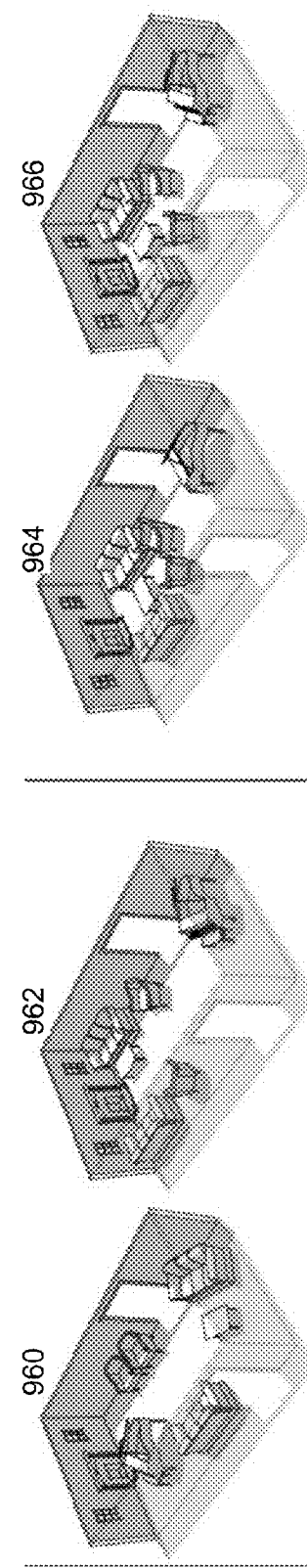
Figure 9E:
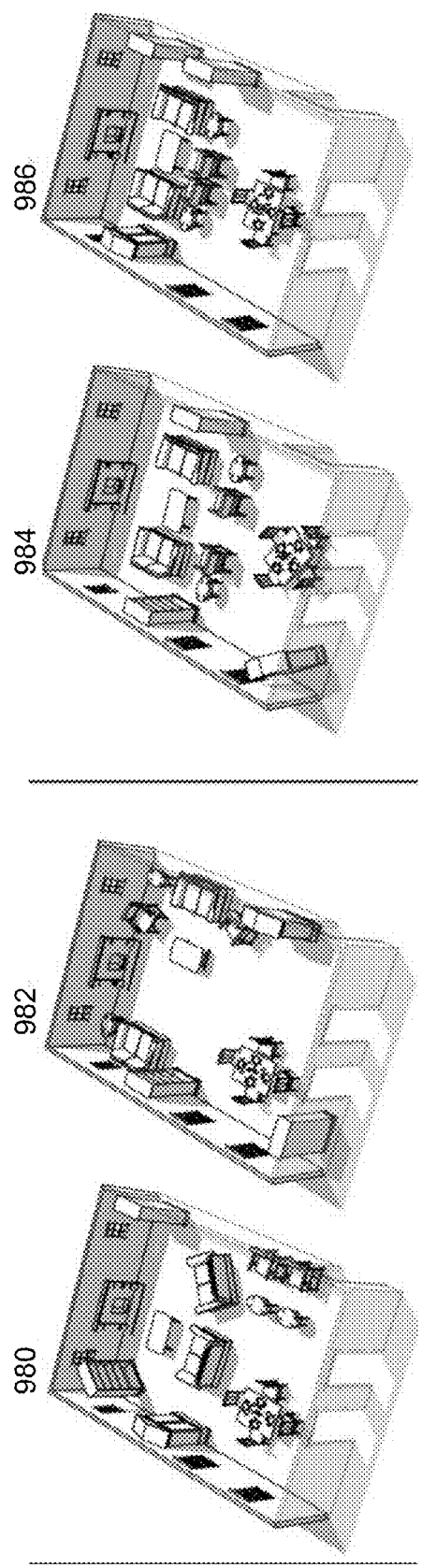

For illustrative purposes, some of the layouts produced by participants during the study are shown in FIGS. 9A through 9E. FIG. 9A corresponds to room 800 where configurations 900 and 902 were developed with suggestions and configurations 904 and 906 were developed without suggestions. FIG. 9B corresponds to room 802 where configurations 920 and 922 were developed with suggestions and configurations 924 and 926 were developed without suggestions. FIG. 9C corresponds to room 804 where configurations 940 and 942 were developed with suggestions and configurations 944 and 946 were developed without suggestions. FIG. 9D corresponds to room 806 where configurations 960 and 962 were developed with suggestions and configurations 964 and 966 were developed without suggestions. FIG. 9E corresponds to room 808 where configurations 980 and 982 were developed with suggestions and configurations 984 and 986 were developed without suggestions.

Discussion

An interactive furniture layout system according to embodiments of the present invention has been presented that is driven by a set of interior design guidelines. The system can be augmented in a number of ways. In an embodiment, the layout criteria are currently evaluated over the ground plane and the height of objects in not taken into account; this can be addressed by an extension to the analytic formulations of the guidelines. In another embodiment, if the room is tightly packed with furniture, with little to no free space, the effectiveness of the sampler is reduced; this can be addressed by a more sophisticated proposal distribution. In another embodiment, the presented approach can be implemented in non-residential spaces such as auditoria and conference halls. Such spaces may use different layout criteria and different proposal moves as would be known to those of ordinary skill in the art. Further, the system can be extended to suggest new furniture that augments the current set.

The employed design guidelines were distilled from interviews with practicing interior designers and from published sources. In an embodiment, the operationalization of these guidelines is simplified. Interior designers consider furniture layout alongside the selection of color and material, lighting design, arrangement of art and accessories, carpeting, and detailed traffic patterns through the space. Other embodiment of the present invention extend the presently described teachings to integrate such criteria, which could be expressed as additional terms in the density function, at the cost of increased dimensionality, for example.

Arrangements produced by different designers exhibit stylistic marks that are recognizable by professionals may not be amenable to analytical formulations. Such stylistic variability could be learned from data. Such data-driven approaches could enable computational representations of a wider scope of functional and aesthetic principles employed by professionals in interior design and other disciplines. Such representations can assist the development of intelligent interfaces for everyday design.

There are many different modifications that could be made to the interior design principles and the manner in which they are formalized as would be understood by those of ordinary skill in the art upon understanding the teachings of the present invention. The present invention is not limited to home furniture and is indeed applicable to other types of furniture including office furniture. Other embodiments can assist in the layout of accessories (e.g., pictures, ornamentation), as well as suggestions for color schemes, lighting, etc. Alternative implementations of the present invention could be implemented for industrial design of buildings and the rooms and facilities within them.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., Flash media or hard-disk drive or any type of solid-state random-access semiconductor memory) on which alterable information is stored.

It should be appreciated by those skilled in the art that the specific embodiments disclosed above may be readily utilized as a basis for modifying or designing other techniques for carrying out the same purposes of the present invention. It should also be appreciated by those skilled in the art that such modifications do not depart from the scope of the invention as set forth in the appended claims.

We claim:
1. A computer-implemented method for visually representing an arrangement of furniture, comprising:
    receiving, by a computer, attributes for at least one room;
    receiving, by the computer, attributes for one or more items of furniture to be placed in the at least one room;
    receiving, by the computer, placement information for the one or more items of furniture;

generating, by the computer, at least one suggestion for placement of the one or more items of furniture in the room, wherein the suggestions meet at least one predetermined design criteria and wherein one of the at least one predetermined design criteria is computationally represented as terms in a density function; and displaying, by the computer, one of the at least one suggestions for placement of the one or more items of furniture in the room.

2. The computer-implemented method of claim 1, wherein the placement information includes information about whether an item of furniture is fixed within the room.

3. The computer-implemented method of claim 2, wherein the placement information is computationally represented as a subspace constraint.

4. The computer-implemented method of claim 1, wherein generating the at least one suggestion for placement of the one or more items of furniture in the room is performed by sampling a density function that implements interior design guidelines.

5. The computer-implemented method of claim 4, wherein sampling is performed using a Markov chain Monte Carlo sampler.

6. The computer-implemented method of claim 1, wherein the at least one predetermined design criteria includes a circulation criteria.

7. The computer-implemented method of claim 6, wherein the circulation criteria includes a free configuration space that allows circulation through a room and access to a set of the one or more items of furniture.

8. The computer-implemented method of claim 1, wherein the at least one predetermined design criteria includes a conversation criteria.

9. The computer-implemented method of claim 8, wherein the conversation criteria includes furniture angle criteria that positions a set of the one or more items of furniture toward each other.

10. The computer-implemented method of claim 1, wherein the at least one predetermined design criteria includes a clearance criteria.

11. The computer-implemented method of claim 10, wherein the clearance criteria includes open space distances adjacent to the one or more items of furniture.

12. The computer-implemented method of claim 1, wherein the at least one predetermined design criteria includes a visual criteria.

13. The computer-implemented method of claim 1, wherein the at least one predetermined design criteria includes a balance criteria.

14. The computer-implemented method of claim 13, wherein the balance criteria includes a distribution of the visual weight for the one or more items of furniture.

15. The computer-implemented method of claim 1, wherein the at least one predetermined design criteria includes an alignment criteria.

16. The computer-implemented method of claim 15, wherein the alignment criteria includes parallel placement relative to one or more walls and relative to the one or more items of furniture.

17. A non-transitory computer-readable medium including instructions that, when executed by a processing unit, cause the processing unit to implement a method for visually representing an arrangement of furniture, comprising:

receiving attributes for at least one room;
receiving attributes for one or more items of furniture to be placed in the at least one room;
receiving placement information for the one or more items of furniture;
generating at least one suggestion for placement of the one or more items of furniture in the room, wherein the suggestions meet at least one predetermined design criteria and wherein one of the at least one predetermined design criteria is computationally represented as terms in a density function; and
displaying one of the at least one suggestions for placement of the one or more items of furniture in the room.

18. The non-transitory computer-readable medium of claim 17, wherein the placement information includes information about whether an item of furniture is fixed within the room.

19. The non-transitory computer-readable medium of claim 18, wherein the placement information is computationally represented as a subspace constraint.

20. The non-transitory computer-readable medium of claim 17, wherein generating the at least one suggestion for placement of the one or more items of furniture in the room is performed by sampling a density function that implements interior design guidelines.

21. The non-transitory computer-readable medium of claim 20, wherein sampling is performed using a Markov chain Monte Carlo sampler.

22. The non-transitory computer-readable medium of claim 17, wherein the at least one predetermined design criteria includes a circulation criteria.

23. The non-transitory computer-readable medium of claim 22, wherein the circulation criteria includes a free configuration space that allows circulation through a room and access to a set of the one or more items of furniture.

24. The non-transitory computer-readable medium of claim 17, wherein the at least one predetermined design criteria includes a conversation criteria.

25. The non-transitory computer-readable medium of claim 24, wherein the conversation criteria includes furniture angle criteria that positions a set of the one or more items of furniture toward each other.

26. The non-transitory computer-readable medium of claim 17, wherein the at least one predetermined design criteria includes a clearance criteria.

27. The non-transitory computer-readable medium of claim 26, wherein the clearance criteria includes open space distances adjacent to the one or more items of furniture.

28. The non-transitory computer-readable medium of claim 17, wherein the at least one predetermined design criteria includes a visual criteria.

29. The non-transitory computer-readable medium of claim 17, wherein the at least one predetermined design criteria includes a balance criteria.

30. The non-transitory computer-readable medium of claim 29, wherein the balance criteria includes a distribution of the visual weight for the one or more items of furniture.

31. The non-transitory computer-readable medium of claim 17, wherein the at least one predetermined design criteria includes an alignment criteria.

32. The non-transitory computer-readable medium of claim 31, wherein the alignment criteria includes parallel placement relative to one or more walls and relative to the one or more items of furniture.

33. A computing device comprising:
a data bus;
a memory unit coupled to the data bus;
at least one processing unit coupled to the data bus and configured to
receive attributes for at least one room;

receive attributes for one or more items of furniture to be placed in the at least one room;
receive placement information for the one or more items of furniture;
generate at least one suggestion for placement of the one or more items of furniture in the room, wherein the suggestions meet at least one predetermined design criteria and wherein one of the at least one predetermined design criteria is computationally represented as terms in a density function; and
display one of the at least one suggestions for placement of the one or more items of furniture in the room.

\* \* \* \* \*